US011475338B2

(12) United States Patent
Zheng

(10) Patent No.: US 11,475,338 B2
(45) Date of Patent: Oct. 18, 2022

(54) METHOD AND SYSTEM FOR EXPLORING A PERSONAL INTEREST SPACE

(71) Applicant: PARTICLE MEDIA, INC., Santa Clara, CA (US)

(72) Inventor: Zhaohui Zheng, Mountain View, CA (US)

(73) Assignee: PARTICLE MEDIA, INC., Santa Clara, CA (US)

( * ) Notice: Subject to any disclaimer, the term of this patent is extended or adjusted under 35 U.S.C. 154(b) by 928 days.

(21) Appl. No.: 16/064,893

(22) PCT Filed: Dec. 21, 2015

(86) PCT No.: PCT/CN2015/098147
§ 371 (c)(1),
(2) Date: Jun. 21, 2018

(87) PCT Pub. No.: WO2017/107026
PCT Pub. Date: Jun. 29, 2017

(65) Prior Publication Data
US 2019/0005398 A1    Jan. 3, 2019

(51) Int. Cl.
*G06N 5/02*    (2006.01)
*G06N 5/04*    (2006.01)
(Continued)

(52) U.S. Cl.
CPC ........... *G06N 5/045* (2013.01); *G06F 16/335* (2019.01); *G06F 16/9027* (2019.01);
(Continued)

(58) Field of Classification Search
USPC ................... 706/12, 45–61; 705/14.25, 7.29
See application file for complete search history.

(56) References Cited

U.S. PATENT DOCUMENTS 6,029,195 A * 2/2000 Herz ...................... G06Q 30/02
725/116
8,301,764 B2 * 10/2012 Konig .................... G06N 20/00
709/224

(Continued)

FOREIGN PATENT DOCUMENTS

CN    102760128 A    10/2012
CN    103235823 A    8/2013
(Continued)

OTHER PUBLICATIONS

Karimi et al., "A Supervised Active Learning Framework for Recommender Systems Based on Decision Trees", Nov. 19, 2014, Springer, User Model User-Adap Inter (2015) 25:39-64, DOI 10.1007/s11257-014-9153-z (Year: 2014).*

(Continued)

*Primary Examiner* — Jue Louie
(74) *Attorney, Agent, or Firm* — Venable LLP

(57) ABSTRACT

The present teaching relates to exploring a personal interest space based on a decision tree. In one example, information related to a personal interest space associated with a user is obtained. The personal interest space includes at least one channel of content that the user is interested in. A decision tree created based on information related to a plurality of users with respect to a plurality of channels of content is obtained. Each node of the decision tree is associated with at least one of the plurality of channels of content. A first node of the decision tree is identified based on the information related to the personal interest space associated with the user. A question for the user in connection with the first node of the decision tree is determined. An answer to the question is received from the user. A second node of the decision tree is identified based on the answer. The personal interest space associated with the user is updated based on the at least one (Continued)

channel of content associated with the second node of the decision tree.

20 Claims, 19 Drawing Sheets

(51) Int. Cl.
*G06Q 30/02* (2012.01)
*G06F 16/9535* (2019.01)
*G06N 20/20* (2019.01)
*G06N 5/00* (2006.01)
*G06F 16/335* (2019.01)
*G06N 20/00* (2019.01)
*G06F 16/901* (2019.01)

(52) U.S. Cl.
CPC ......... *G06F 16/9535* (2019.01); *G06N 5/003* (2013.01); *G06N 20/00* (2019.01); *G06N 20/20* (2019.01); *G06Q 30/02* (2013.01); *G06Q 30/0224* (2013.01)

(56) References Cited

U.S. PATENT DOCUMENTS

| | | | |
|---|---|---|---|
| 8,386,509 B1* | 2/2013 | Scofield | G06F 16/335 707/769 |
| 8,533,129 B2* | 9/2013 | Kejariwal | G06N 20/00 706/12 |
| 9,129,227 B1* | 9/2015 | Yee | G06N 20/00 |
| 9,183,282 B2* | 11/2015 | Singh | G06F 16/9535 |
| 9,245,230 B2* | 1/2016 | Pinckney | G06Q 30/0631 |
| 10,467,327 B1* | 11/2019 | Arazi | G06Q 50/01 |
| 10,817,793 B1* | 10/2020 | Duckworth | G06N 7/005 |
| 2002/0173971 A1* | 11/2002 | Stirpe | G06Q 30/0255 705/14.53 |
| 2005/0102292 A1* | 5/2005 | Tamayo | G06F 16/951 |
| 2008/0103936 A1* | 5/2008 | Churlik | G06Q 30/02 705/26.41 |
| 2009/0062623 A1* | 3/2009 | Cohen | G16H 20/10 600/300 |
| 2009/0164442 A1 | 6/2009 | Shani et al. | |
| 2010/0088332 A1* | 4/2010 | Nussel | G06F 16/9535 707/759 |
| 2010/0161382 A1* | 6/2010 | Cole | G06Q 30/02 705/7.32 |
| 2010/0169803 A1* | 7/2010 | Mazzei | G06Q 30/02 715/760 |
| 2013/0124449 A1* | 5/2013 | Pinckney | G06F 16/2425 706/52 |
| 2014/0236943 A1* | 8/2014 | Li | G06F 16/2457 707/736 |
| 2014/0280251 A1* | 9/2014 | Somekh | G06F 16/9535 707/754 |
| 2014/0325567 A1 | 10/2014 | Mangat et al. | |
| 2014/0358720 A1* | 12/2014 | Morales | G06Q 30/0631 705/26.7 |
| 2015/0112918 A1 | 4/2015 | Zheng et al. | |
| 2015/0206183 A1 | 7/2015 | Zhou et al. | |
| 2017/0091849 A1* | 3/2017 | Greystoke | G06Q 30/0631 |

FOREIGN PATENT DOCUMENTS

| | | |
|---|---|---|
| CN | 104254851 A | 12/2014 |
| CN | 104395901 A | 3/2015 |

OTHER PUBLICATIONS

He et al., "Efficient Personalized Recommendation of Mobile Web Content Using an EM-based Clustering Method", 2014, IEEE, 2014 IEEE International Conference on Computer and Information Technology, p. 152-159 (Year: 2014).*

Golbandi et al., "Adaptive Bootstrapping of Recommender Systems Using Decision Trees", 2011, ACM 978-1-4503-0493-1/11/02, p. 595-604 (Year: 2011).*

Davidson et al., "The YouTube Video Recommendation System", 2010, ACM 978-1-60558-906-0/10/09, p. 293-296 (Year: 2012).*

Cho et al., "A Personalized Recommender System Based on Web Usage Mining and Decision Tree induction", 2002, Expert Systems with Applications 23, p. 329-342 (Year: 2002).*

Sun et al. "Learning Multiple-Question Decision Trees for Cold-Start Recommendation", 2013, WSDM '13: Proceedings of the sixth ACM international conference on Web search and data mining.*

Office Action dated Jul. 2, 2019 in European Application 15911025.3.

Shani, Guy et al., Establishing User Profiles in the MediaScout Recommender System, Proceedings of the 2007 IEEE Symposium on Computational Intelligence and Data Mining (CIDM 2007), Apr. 1, 2007, pp. 470-476.

Office Action dated Feb. 9, 2021 in European Application 15911025.3.

Office Action dated Sep. 17, 2019 in Indonesian Application PID 2018 04396.

International Search Report and Written Opinion dated Sep. 21, 2016 in International Application PCT/CN2015-098147.

* cited by examiner

METHOD AND SYSTEM FOR EXPLORING A PERSONAL INTEREST SPACE

CROSS REFERENCE TO RELATED APPLICATION

This application is a national stage application, filed under 35 U.S.C. § 371, of International Application No. PCT/CN2015/098147, filed on Dec. 21, 2015, entitled "METHOD AND SYSTEM FOR EXPLORING A PERSONAL INTEREST SPACE", which is hereby incorporated by reference in its entirety.

BACKGROUND

1. Technical Field

The present teaching relates to methods, systems, and programming for Internet service. More specifically, the present teaching relates to methods, systems, and programming for exploring a personal interest space.

2. Discussion of Technical Background

The development of the Internet leads to information explosion, where the information and data online are unorganized and have a huge volume. Accordingly, it is difficult to identify useful or interesting information for a particular user from the unorganized and abundant information. Efforts have been made to filter online content provided to a user based on the user's interests.

For example, FIG. 1 depicts a prior art search engine that estimates a user 102's interests based on search queries. A search engine 104 may include a search module 106 that searches documents for specified queries and returns a list of documents where the queries are found. The search engine 104 cannot provide content to the user 102 without a query submitted by the user 102. Some search engines also include a user interest understanding module 108 that estimates the user 102's interests based on the keywords specified in the search queries. The estimated user interests may be used by the search engine 104 to filter and refine search results returned by the search module 106. However, the interest estimation is usually not precise and comprehensive as it depends completely on what the user 102 inputs in the search query. Moreover, the search keywords are a reflection of the user 102's current short-term interests and usually do not indicate the long-term interests of the user 102.

In another example illustrated in FIG. 1, a recommendation engine 110 tries to estimate the user 102's interests by analyzing the user 102's behavior with respect to online content in the content space 112. Some known recommendation engines 110 include a user interest understanding module 114, which uses algorithms such as collaborative filtering to "guess" the possible interests of the user 102. The content recommendation module 116 then retrieves content that falls into the possible interests of the user 102 and recommends them to the user 102. However, prediction accuracy of the traditional recommendation engine 110 is largely relied on the amount of user 102's past behavior data that the recommendation engine 110 can obtain and also the specific algorithm it applies, which oftentimes may not be accurate.

Therefore, there is a need to provide an effective solution for exploring a user's personal interest space to avoid the above-mentioned drawbacks.

SUMMARY

The present teaching relates to methods, systems and programming for Internet service. More specifically, the present teaching relates to methods, systems, and programming for exploring a personal interest space based on a decision tree.

In one example, a method, implemented on at least one computing device each of which has at least one processor, storage, and a communication platform connected to a network for exploring a personal interest space is presented. Information related to a personal interest space associated with a user is obtained. The personal interest space includes at least one channel of content that the user is interested in. A decision tree created based on information related to a plurality of users with respect to a plurality of channels of content is obtained. Each node of the decision tree is associated with at least one of the plurality of channels of content. A first node of the decision tree is identified based on the information related to the personal interest space associated with the user. A question for the user in connection with the first node of the decision tree is determined. An answer to the question is received from the user. A second node of the decision tree is identified based on the answer. The personal interest space associated with the user is updated based on the at least one channel of content associated with the second node of the decision tree.

In another example, a method, implemented on at least one computing device each of which has at least one processor, storage, and a communication platform connected to a network for creating a decision tree is presented. A plurality of pieces of information related to a plurality of users with respect to a plurality of channels of content are obtained. Each of the plurality of pieces of information is indicative of a level at which a respective one of the plurality of users is interested in each of the plurality of channels. A decision tree is created based on the plurality of pieces of information in accordance with a training model. Each node of the decision tree is associated with at least one of the plurality of channels of content.

In a different example, a system for exploring a personal interest space is presented. The system includes a user understanding unit, a decision tree selecting unit, a question initiating unit, a question selecting unit, a decision tree traversing unit, and a decision tree traversing unit. The user understanding unit is configured for obtaining information related to a personal interest space associated with a user. The personal interest space includes at least one channel of content that the user is interested in. The decision tree selecting unit is configured for obtaining a decision tree created based on information related to a plurality of users with respect to a plurality of channels of content. Each node of the decision tree is associated with at least one of the plurality of channels of content. The question initiating unit is configured for identifying a first node of the decision tree based on the information related to the personal interest space associated with the user. The question selecting unit is configured for determining a question for the user in connection with the first node of the decision tree. The decision tree traversing unit is configured for identifying a second node of the decision tree based on an answer to the question from the user. A decision tree traversing unit is configured for updating the personal interest space associated with the user based on the at least one channel of content associated with the second node of the decision tree.

Other concepts relate to software for implementing the present teaching on exploring a personal interest space. A software product, in accord with this concept, includes at least one non-transitory, machine-readable medium and information carried by the medium. The information carried by the medium may be executable program code data, parameters in association with the executable program code, and/or information related to a user, a request, content, or information related to a social group, etc.

In one example, a non-transitory, machine-readable medium having information recorded thereon for exploring a personal interest space is presented. The recorded information, when read by the machine, causes the machine to perform a series of processes. Information related to a personal interest space associated with a user is obtained. The personal interest space includes at least one channel of content that the user is interested in. A decision tree created based on information related to a plurality of users with respect to a plurality of channels of content is obtained. Each node of the decision tree is associated with at least one of the plurality of channels of content. A first node of the decision tree is identified based on the information related to the personal interest space associated with the user. A question for the user in connection with the first node of the decision tree is determined. An answer to the question is received from the user. A second node of the decision tree is identified based on the answer. The personal interest space associated with the user is updated based on the at least one channel of content associated with the second node of the decision tree.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
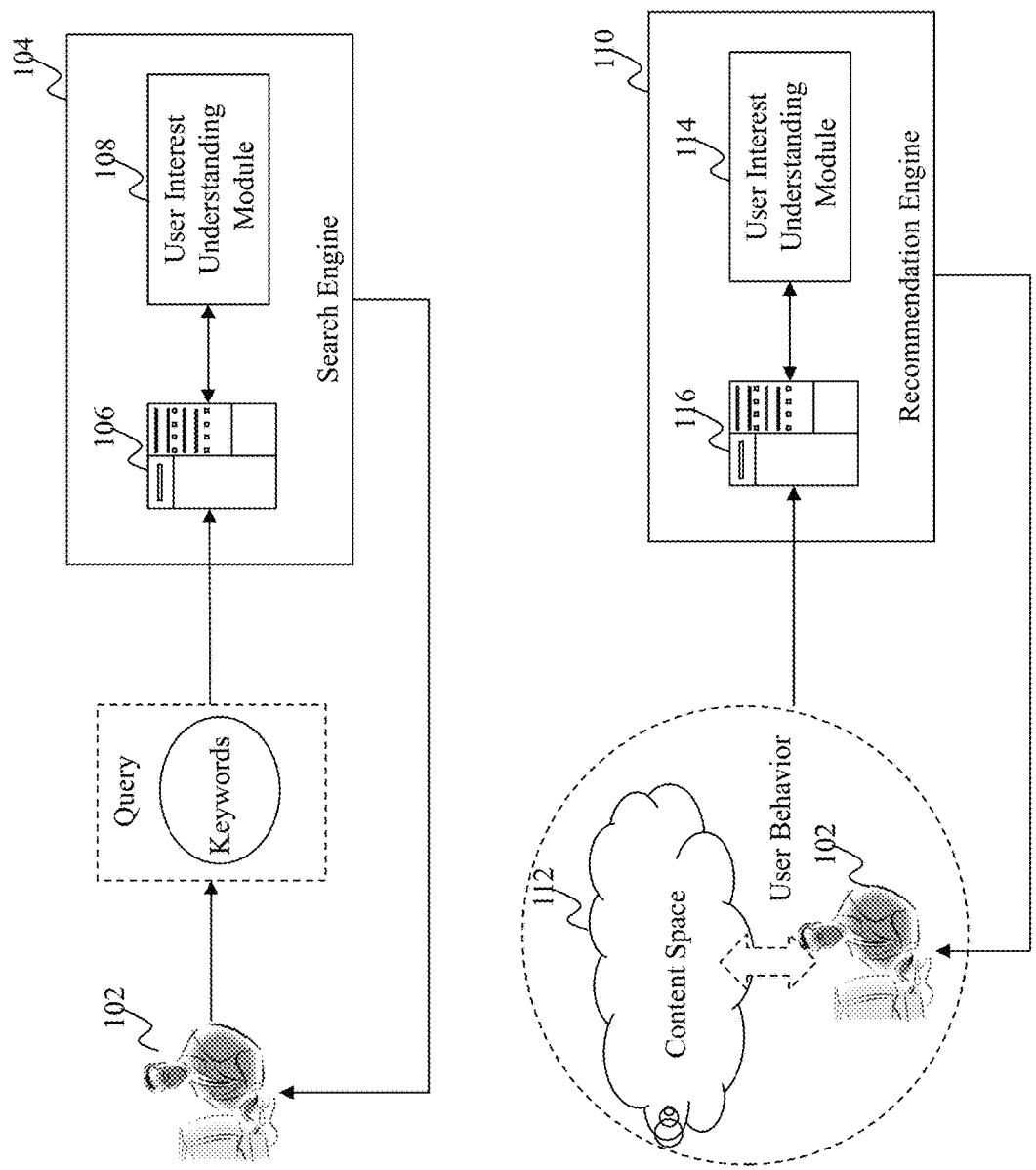
FIG. 1 depicts a prior art search engine that estimates a user's interests based search queries and a prior art recommendation engine that estimates a user's interests based on user behavior.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The present teaching describes methods, systems, and programming aspects of exploring a user's personal interest space based on smart, personalized, and adaptive questioning in accordance with a decision forest, realized as a specialized and networked system by utilizing one or more computing devices (e.g., mobile phone, personal computer, etc.) and network communications (wired or wireless). From the user's perspective, every time the user answers a question, the content stream may be dynamically updated to reflect the better understanding of the user's interests.

In one aspect of the present teaching, information related to existing users' interests with respect to channels of content in their personal interest spaces are utilized as training data to create a decision forest (having one or more decision trees) for exploring a user's personal interest space. The information used for training the decision forest is reliable and accurate because it comes from existing user's personal interest spaces that reflect the existing users' long-term and stable interests with respect to each channel of content. Thus, the decision forest is more reliable and accurate than the models used by the known search engines and recommendation engines for estimating users' interests.

In another aspect of the present teaching, a user's personal interest space is explored (e.g., by refining existing channels of content, adding new channels of content, etc.) in an interactive manner which involves the user's active participation in the process. For example, smart and fruitful questions are asked at the right timings based on the trained decision forest, and the answers from the user are used as a guidance to update the user's personal interest space. To achieve better user experience and efficiency, the questioning process is personalized for each user in the sense that the decision forest (having one or more decision trees) used for generating the questions may be selected for each individual user and the specific question to be asked may be tailored to fit each individual user's profile and known interests. The questioning process is also performed in an adaptive way as the user's answers to the previous questions may affect the next question to be asked.

Additional novel features will be set forth in part in the description which follows, and in part will become apparent to those skilled in the art upon examination of the following and the accompanying drawings or may be learned by production or operation of the examples. The novel features of the present teaching may be realized and attained by practice or use of various aspects of the methodologies, instrumentalities and combinations set forth in the detailed examples discussed below.

Figure 2:
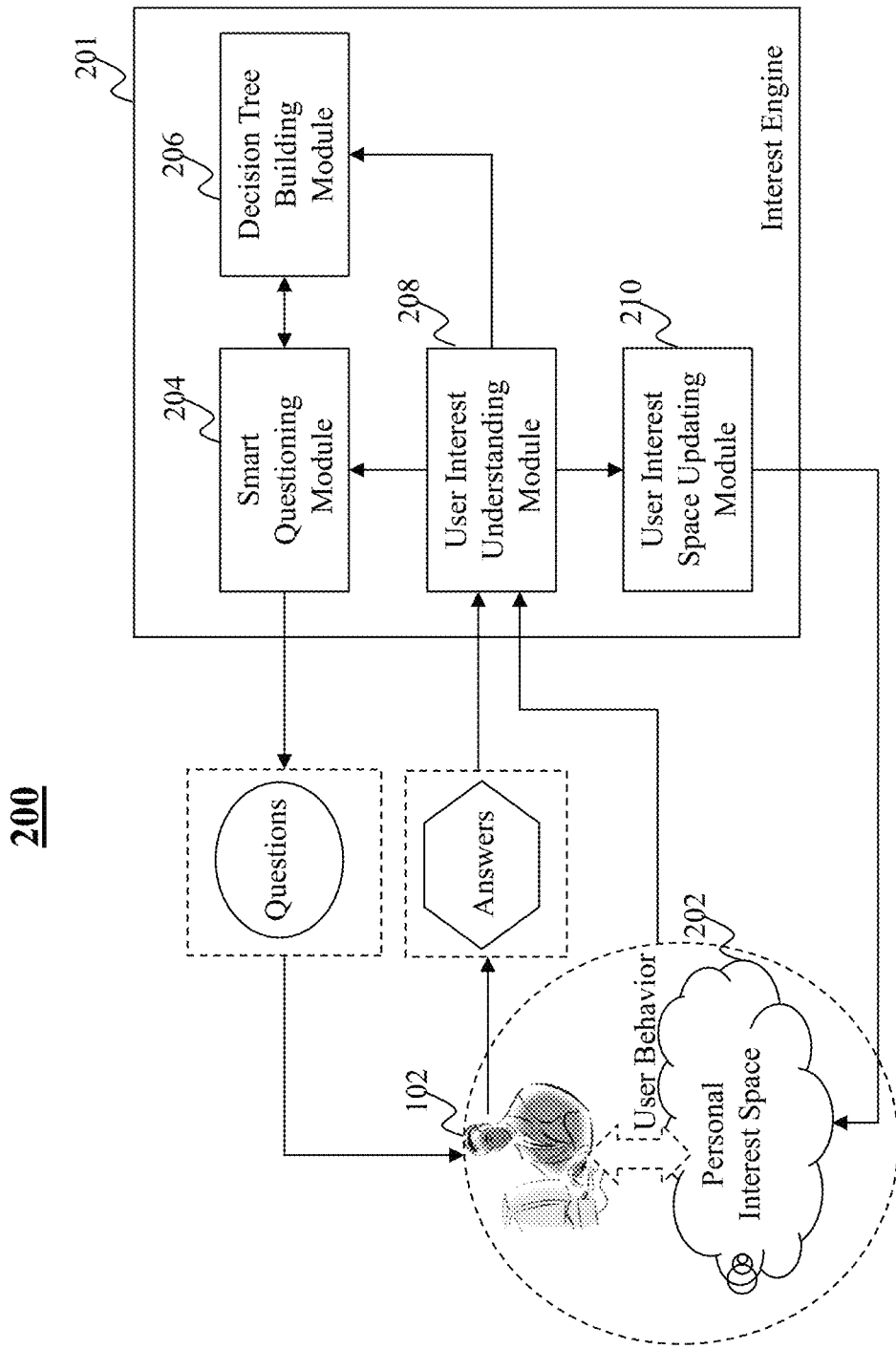
FIG. 2 is a high level exemplary system diagram of a system for exploring a personal interest space, according to an embodiment of the present teaching.

FIG. 2 is a high-level exemplary system diagram of a system for exploring a personal interest space, according to an embodiment of the present teaching. The system 200 in this embodiment includes an interest engine 201 that creates and updates a personal interest space 202 for a user 102. The system 200 is a technology-driven, interest-oriented content portal, "interest portal" in short, which facilitates users to efficiently define and explore their personal interest spaces. The interest portal may be supported by the interest engine 201 which seamlessly integrates the cutting-edge technologies of search and recommendation to enable a unique and personalized content consumption experience for the user 102. The interest engine 201 may evolve the user 102's interests by continuously learning from the user 102's interactions with the recommended content as well as the social circles, and algorithmically deliver the most personally relevant content with respect to the user 102's interests.

The interest engine 201 in this embodiment can organize online information into different channels of content. Each channel includes content items that are related to a common topic or category or have a common feature, e.g., popular items, trending items, etc. The interest engine 201 may periodically crawl online for news or other content from the Internet, and classify the crawled content items into different channels, according to their respective topics. This operation may not need any involvement of the user 102. A channel may also include one or more sub-channels, each of which includes content items associated with a sub-topic of the topic associated with the channel. For example, a channel associated with topic "sports" may include sub-channels associated with topics like "tennis," "basketball," "swimming," "running," etc. A channel may be correlated to another channel, based on a correlation between their respective topics. For example, channel "travel" may be correlated with channel "flight ticket," and channel "children" may be correlated with channel "minivan." Similarly, a sub-channel may be correlated with another sub-channel.

The interest engine 201 may store all channels assigned to the user 102 into the personal interest space 202 associated with the user 102. In addition to information about the channels, the personal interest space 202 may also include information about, for example, correlations between the channels, other users connected to the user 102, one or more channels shared by the user 102 with other users, channel weights associated with the channels, etc. A channel weight associated with a channel in a personal interest space 202 may indicate how important the channel is to the user 102 or how interesting the channel is to the user 102. Different users can have different personal interest spaces.

Accordingly, the interest engine 201 may also store different content channels associated with metadata. For example, metadata associated with a channel may include information about, for example, dynamic content provided by the interest engine 201 through the channel, sub-channels in the channel, subscribed users of the channel, correlations between the channel and other channels, an assigned advertiser for the channel, etc. The interest engine 201 may assign an advertiser to a channel based on a bidding process performed with respect to a plurality of advertisers. For example, based on a bidding process performed with respect to Apple Inc. and Samsung Group, the interest engine 201 may assign one of them to channel "smartphone" such that the assigned advertiser has authority to put its advertisements into the channel.

The interest engine 201 may provide dynamic content to a subscribed user 102 through the channel. Dynamic content refers to content within a channel, when the interest engine 201 can keep updating content in the channel based on newly obtained information from the Internet and/or activities of a subscribed user 102. After the interest engine 201 assigns a channel to a personal interest space of a user 102, the channel may become a personal channel for the user 102, such that content provided through the channel to the user 102 may be different from content provided to other users subscribed to the channel. For example, two users subscribed to channel "electronics" may gradually receive different content items provided by the interest engine, after one user clicks most articles in the channel about smartphones and the other user clicks most articles in the channel about digital cameras.

A user 102 may subscribe to a channel (or a sub-channel) provided by the interest engine 201. In other words, the interest engine 201 may assign a channel to a user 102 after the user 102 submits a subscription request for the channel. In addition, the interest engine 201 may assign one or more channels to a user 102 based on, e.g., a query submitted by the user 102 for channels, a channel previously assigned to the user 102, a channel subscribed to by the user 102, content items browsed or viewed by the user 102, channels associated with other users, or channels selected randomly for testing the user 102's interest. Details of an interest engine 201 are provided, for example, in PCT Patent Application No. PCT/CN2015/089288, filed Sep. 9, 2015, entitled "METHOD AND SYSTEM FOR PROVIDING ORGANIZED CONTENT," which is incorporated herein by reference in its entirety.

In this embodiment, the interest engine 201 includes a smart questioning module 204, a decision tree building module 206, a user interest understanding module 208, and a user interest space updating module 210. The modules mentioned above are used for exploring the user 102's personal interest space 202 via an interactive process (e.g., questions and answers) based on a decision forest having one or more decision trees.

The smart questioning module 204 in this embodiment ensures that for each specific user 102, the right questions are asked at the right timings in the right context so that the interest engine 201 can explore the user 102's person interest space 202 and better understand the user 102's interests. In one embodiment, the growth of the user 102's personal interest space 202 may reach a plateau/bottle neck, for example, when the user 102's interaction with the personal interest space 202 decreases. This may be a right timing for the smart questioning module 204 to ask a question for the user 102 in order to encourage the user 102 to actively express her/his interests and further explore the personal interest space 202. In another embodiment, when a new user 102 signs-up for the interest engine 201, it may be a right timing for the smart questioning module 204 as well to encourage the new user 102 to actively express her/his interests and start to interact with the interest engine 201 in order to build up the personal interest space 202. On the other hand, for better user experience, the smart questioning module 204 may also control the timer intervals between asking each question. For example, based on each user's historical behavior with respect to questions, a threshold time interval (e.g., once per day, once per week, etc.) may be set up.

The smart questioning module 204 in this embodiment, at the right timings, selects the right questions that are deemed to be friendly to the user 102 and can gain a better understanding of the user's 102 interests. Based on information of the user 102, e.g., the user 102's personal interest space 202 and personal profile, the smart questioning module 204 may identify one or more nodes in one or more decision trees created by the decision tree building module 206. Each node is associated with a channel of content. Based on the node and the channel associated therewith, the smart questioning module 204 may select, from a plurality of preset questions associated with the node/channel, a question that fits for the user 102. When selecting the question, the smart questioning module 204 may consider the user 102's personal profile to avoid duplicated or contradicting questions. In order to attract the user 102's to answer the question, the smart questioning module 204 may also consider the user 102's known interests and personal profile to select the most interesting question for the user 102.

The decision tree building module 206 in this embodiment serves as a backend module to support the smart questioning module 204. Based on existing users' personal interest spaces, the decision tree building module 206 can generate a channel vector for each existing user as a piece of training data. Each feature in the channel vector corresponds to the existing user's level of interest with respect to a respective channel. The number of features (channels) may be predefined, e.g., including 10,000 channels. The values of each channel feature may be determined based on the existing user's behavior with respect to the channels in its personal interest space. For example, if the existing user has subscribed to a particular channel, then the value of this channel feature may be "1" in a binary value scale. And if the existing user not only has subscribed to the channel but also actively consumed the content recommended in the channel, then a high positive value may be assigned, e.g., 0.9 in a (−1 to 1) value scale. In another example, if the existing user has explicitly expressed that she/he is not interested in a channel, e.g., by declining the recommendation of the channel or unsubscribing the channel, then a value of "0" or a low negative value may be assigned to this channel feature depending on the value scales used. In still another example, if there is no indication as to whether the existing user is interested in the channel or not, then an "unassigned" value may be assigned to the corresponding channel feature initially. Channel vectors of multiple existing users may be combined to form a training data matrix.

Figure 11:
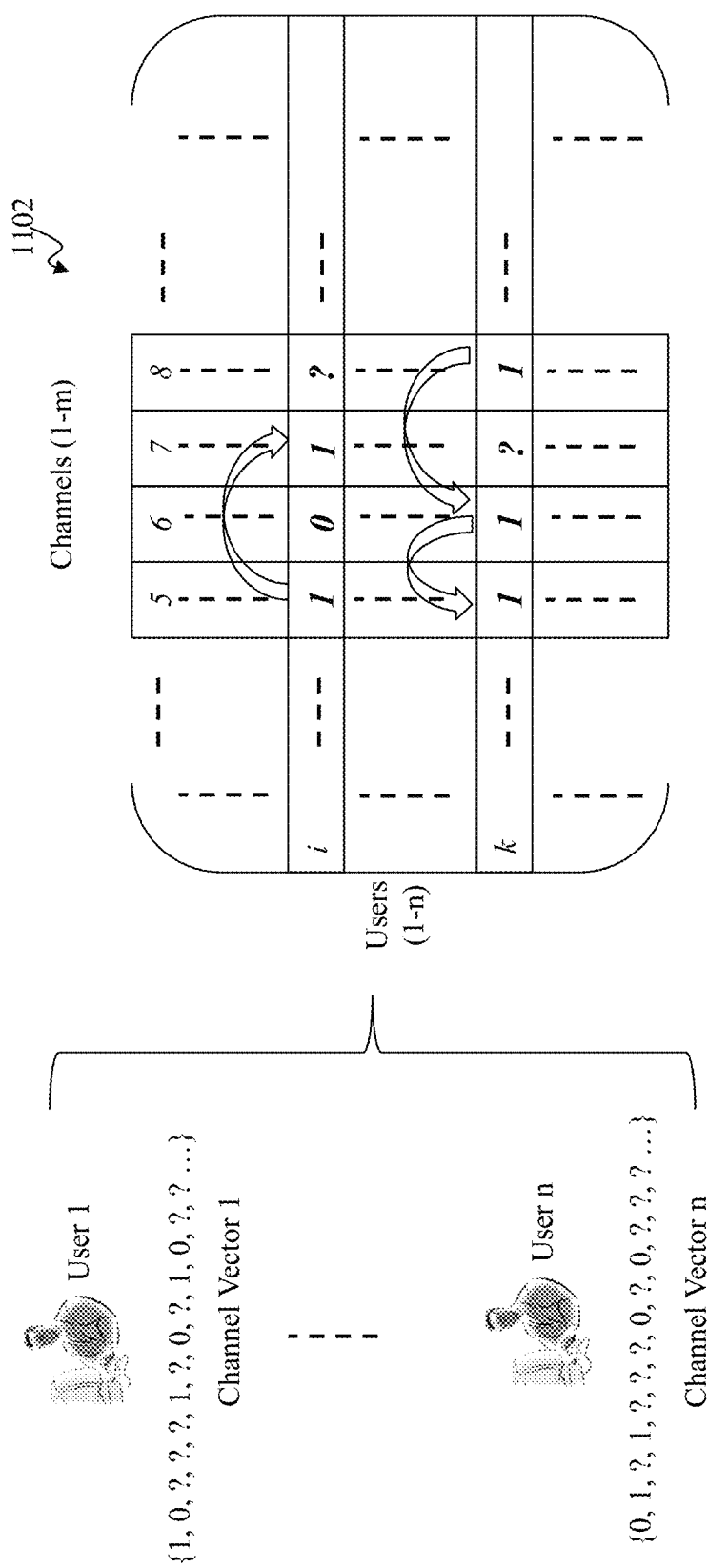
FIG. 11 is a depiction of exemplary training data for decision tree training, according to an embodiment of the present teaching.

Referring now to FIG. 11, an exemplary training data matrix 1102 is illustrated. The training data matrix 1102 is formed by channel vectors 1-$n$ of users 1-$n$ as shown in FIG. 11. Each channel vector comprises values of m channel features (1-$m$). In this example, a binary value scale is used, so that the value of each channel feature may be "1," "0," or "? (unassigned)" depending on whether the user is interested in the corresponding channel. It is understood that in other embodiments, the value may reflect the level of interest with respect to the channel in non-binary value scales. As shown in FIG. 11, each row of the training data matrix 1102 represents one channel vector for a specific user with respect to all the channel features used (1-$m$), and each column of the training data matrix 1102 represents all users (1-$n$)' levels of interest with respect to a specific channel. For example, the training data matrix 1102 may show that user i has subscribed to channels 5 and 7, declined to subscribe to channel 8, and not shown whether she/he is interested in channel 8. In this embodiment, the sequence of channel subscription may be stored with the training data matrix 1102 as well. For example, the training data matrix 1102 may show that user i subscribed to channel 7 after she/he subscribed to channel 5. Similarly, for example, the training data matrix 1102 may show that user k has subscribed to channels 8, 6, and 5 in sequence and not shown whether she/he is interested in channel 7.

Returning to FIG. 2, the decision tree building module 206 then uses the training data matrix formed of channel vectors of a number of existing users to train a decision tree. In this embodiment, expectation-maximization (EM) models may be used to train the decision tree based on the training data matrix, and the details will be discussed later. Each node of the decision tree is associated with a channel of content and a user segment. The granularity of the decision tree becomes finer as traversing down the decision tree.

It is understood that the decision tree is created based on the specific data matrix used for training. Thus, in some embodiments, the decision tree building module 206 may create multiple decision trees to form a decision forest based on different training data matrices. In one example, the decision tree building module 206 may select a subset of existing users sharing the same or similar profiles (e.g., a male user subset, a young professional user subset, etc.) and train a decision tree that is considered to be more relevant to the specific user group. In another example, the decision tree building module 206 may select a subset of channel features (e.g., channel features related to sports) and train a decision tree that is considered to be more relevant to the specific channel group. Accordingly, the decision tree building module 206 can create a generic decision tree and/or various specific decision trees according to different training data sets.

Figure 12:
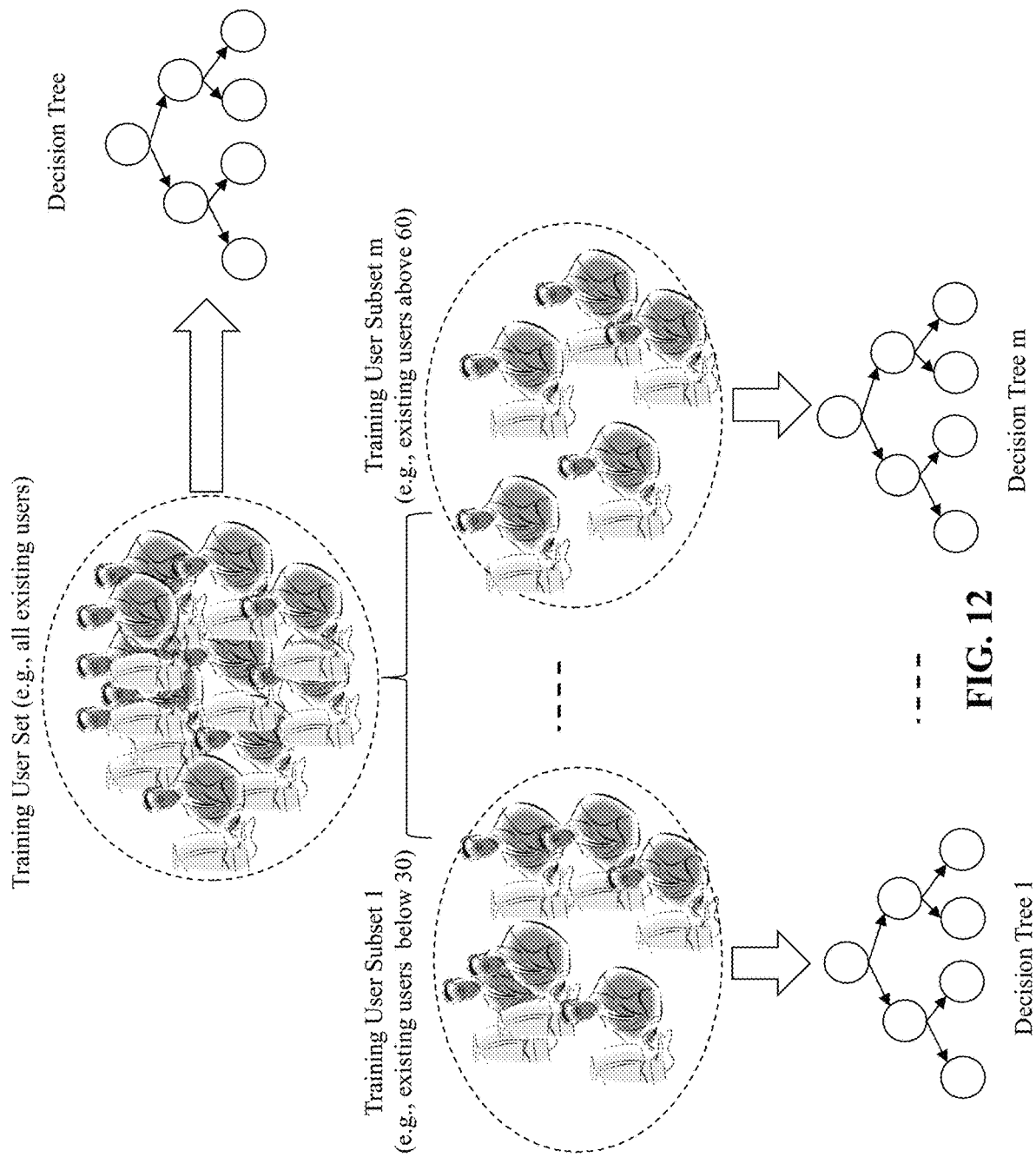
FIG. 12 is a depiction of an exemplary process of building decision trees based on user subset training data, according to an embodiment of the present teaching.

Referring now to FIG. 12, a decision tree may be trained based on a training user set with all the existing users. The training user set may be partitioned into m training user subsets (1-$m$). In this example, the partitioning may be performed based on the users' age groups. For example, training user subset 1 includes existing users below 30, and training user subset m includes existing users above 60. For each training user subset, the corresponding training data matrix may be formed and used to train a decision tree 1-$m$. Each decision tree 1-$m$ may be considered to be more relevant to the users in the corresponding user age group in this example. In the future, in order to explore a user's personal interest space, a decision tree that matches with the user's age group may be selected from the decision trees 1-$m$ and used to determine questions to be asked for the user.

Figure 13:
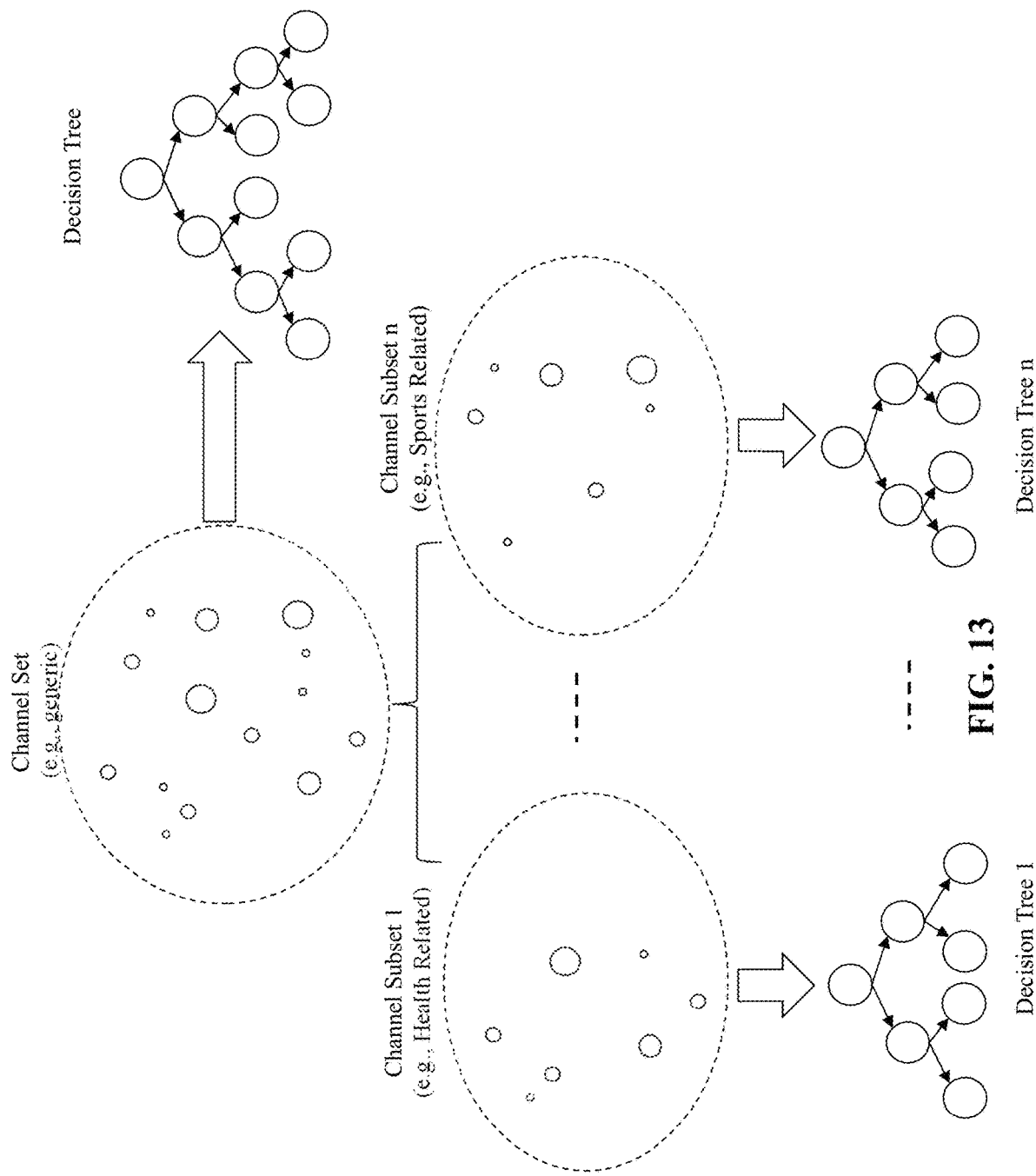
FIG. 13 is a depiction of an exemplary process of building decision trees based on channel subset training data, according to an embodiment of the present teaching.

Similarly, in FIG. 13, a decision tree may be trained based on a channel set with a relatively large number of channel features (e.g., a generic channel set). The channel set may be partitioned into n channel subsets (1-$n$). For example, channel subset 1 includes health-related channels, and channel subset n includes sports-related channels. For each channel subset, the corresponding training data matrix may be formed and used to train a decision tree 1-*n*. Each decision tree 1-*n* may be considered to be more relevant to the channels in the corresponding channel subset in this example. In the future, in order to explore a user's personal interest space, a decision tree that matches with the user's currently-subscribed channels may be selected from the decision trees 1-*m* and used to determine questions to be asked for the user. It is understood that, in some embodiments, in order to explore the user's known interests, a decision tree that does not match with the user's currently-subscribed channels may be intentionally chosen and used to determine questions to be asked for the user. It is also understood that the partition of a training data set may be performed in both the user and channel dimensions in some embodiments.

Returning to FIG. 2, the user interest understanding module 208 in this embodiment is responsible for understanding the user 102's interests based on answers from the user 102 in response to the questions asked by the smart questioning module 204. The user interest understanding module 208 may also estimate the user's interests by analyzing user behavior with respect to the personal interest space 202. An answer from the user 102 in response to a question is guidance on how to traverse the decision tree and find out the corresponding nodes and their associated channels of content. The identified nodes are provided to the smart questioning module 204 so that the smart questioning module 204 can adaptively choose the next question to be asked according to the decision tree. It is understood that in some embodiments, the answer may not be an explicitly received from the user 102. Instead, the user 102 may ignore the questions, but perform certain actions that can be implied as answering to the question. For example, the question is related to whether the user 102 is interested in drone. Instead of providing an explicit answer, the user 102 may start to search channels related to drone or browser content related to drone, then the user interest understanding module 208 may treat the user's actions as an implicit answer to the question. In some embodiments, if neither an explicit nor an implicit answer (e.g., user actions) is received from the user 102 for a particular question, the smart questioning module 204 may ask the same question, or a different question associated with the same node, after a certain time interval. If no response has been received after several tries, the smart questioning module 204 may identify a different node in the decision tree and ask a different question.

The identified channels of content are provided to the user interest space updating module 210 for updating the personal interest space 202 with a better understanding of the user 102's interests. For example, a new channel may be added to the personal interest space 202, an existing channel may be refined to focus on a more specific topic, and multiple channels may be merged to form a more generic channel. It is understood that the personal interest space 202 of the user 102 is dynamically updated upon receiving each answer from the user 102. In some embodiments, the recommended content stream is instantly updated as well according to the dynamically updated personal interest space 202.

Figure 3:
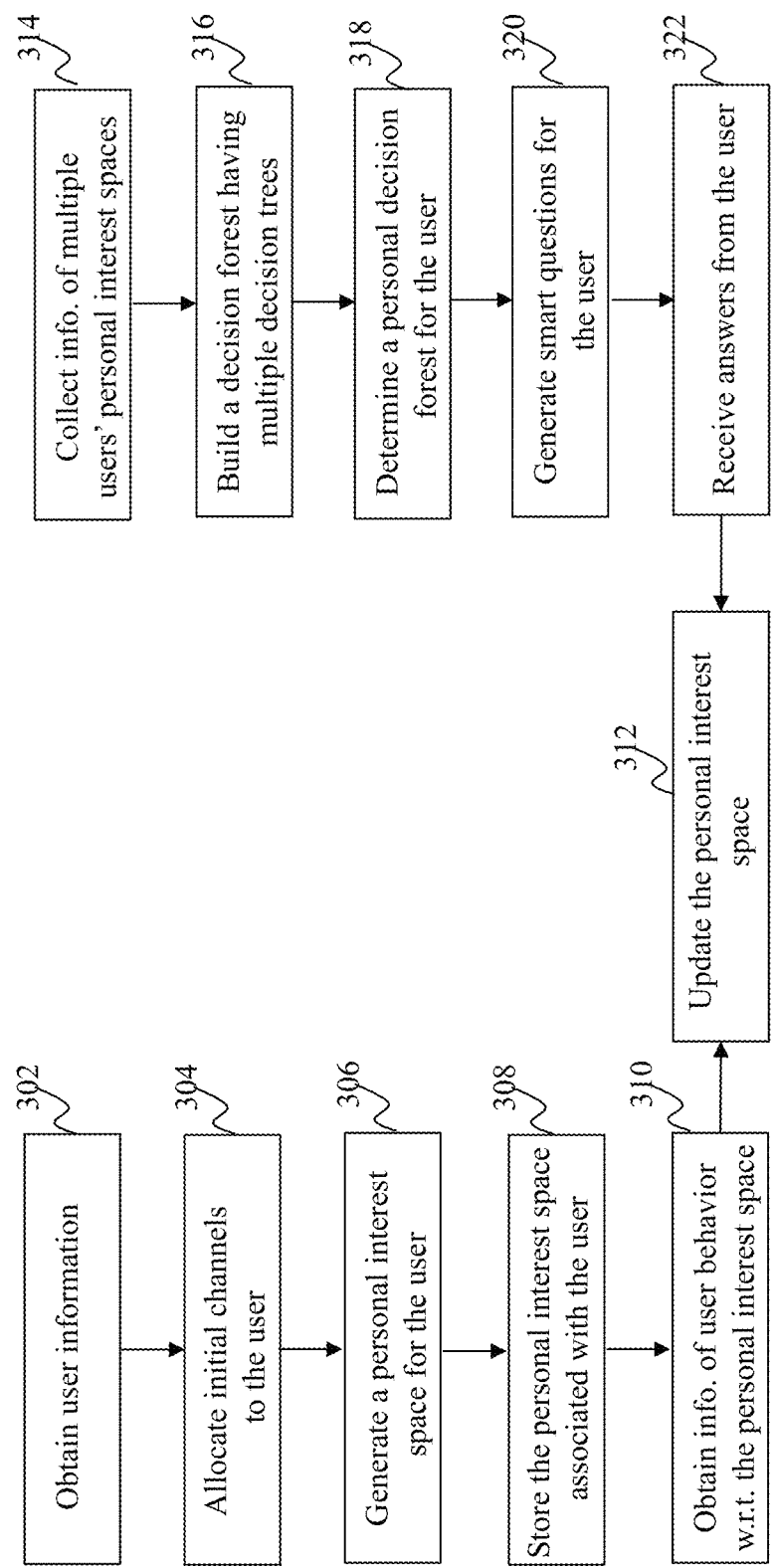
FIG. 3 is a flowchart of an exemplary process performed by the system for exploring a personal interest space, according to an embodiment of the present teaching.

FIG. 3 is a flowchart of an exemplary process performed by the system for exploring a personal interest space, according to an embodiment of the present teaching. Starting at 302, user information is obtained. The user information may include demographic information, such as age, gender, occupation, race, etc., the user's social connections, the user's declaration interests, and the user's historical behavior data. At 304, initial channels are allocated to the user based on the obtained user information. For example, one or more channels may be recommended to the user for subscription. At 306, a personal interest space is generated for the user. The user interest space may include at least some of the initial channels that have been explicitly subscribed to by the user. In some embodiments, the user may actively participate in the process of generating the personal interest space by, for example, searching and subscribing to certain channels of interest even though they are not recommended to the user. At 308, the personal interest space associated with the user is stored. At 310, user behavior with respect to the personal interest space is monitored, and the user behavior information is obtained. The user behavior includes, for example, consumption of content provided in the subscribed channels. At 312, the personal interest space is updated based on the user behavior information. In other words, channels in the personal interest space may be dynamically changed over time.

On the other hand, at 314, information of multiple existing users' personal interest spaces is collected. Each of the existing users' personal interest spaces may be used to generate a channel vector for the existing user, which is indicative of a level at which the existing user is interested in each of the plurality of channels. At 316, a decision forest having one or more decision trees is built based on the information obtained at 314. For example, the information may be converted into a training data matrix. A decision tree may be trained based on the training data matrix using an EM model. At 318, a personal decision forest may be determined for the user. The personal decision forest may include a generic decision tree trained based on training data from all existing users and one or more specific decision trees trained based on subsets of training data related to a specific user group or a channel feature group. The specific decision trees may be selected based on the user's information, e.g., the user's demographic information and the user's currently-subscribed channels in the personal interest space. At 320, smart questions are generated and asked for the user based on the user's information and the user's personal decision forest. At 322, answers to the questions are received from the user. The answers may be mapped to one or more channels of content according to the personal decision forest. Continuing to 312, the personal interest space is updated based on the channels associated with the user's answers to the smart questions.

Figure 4:
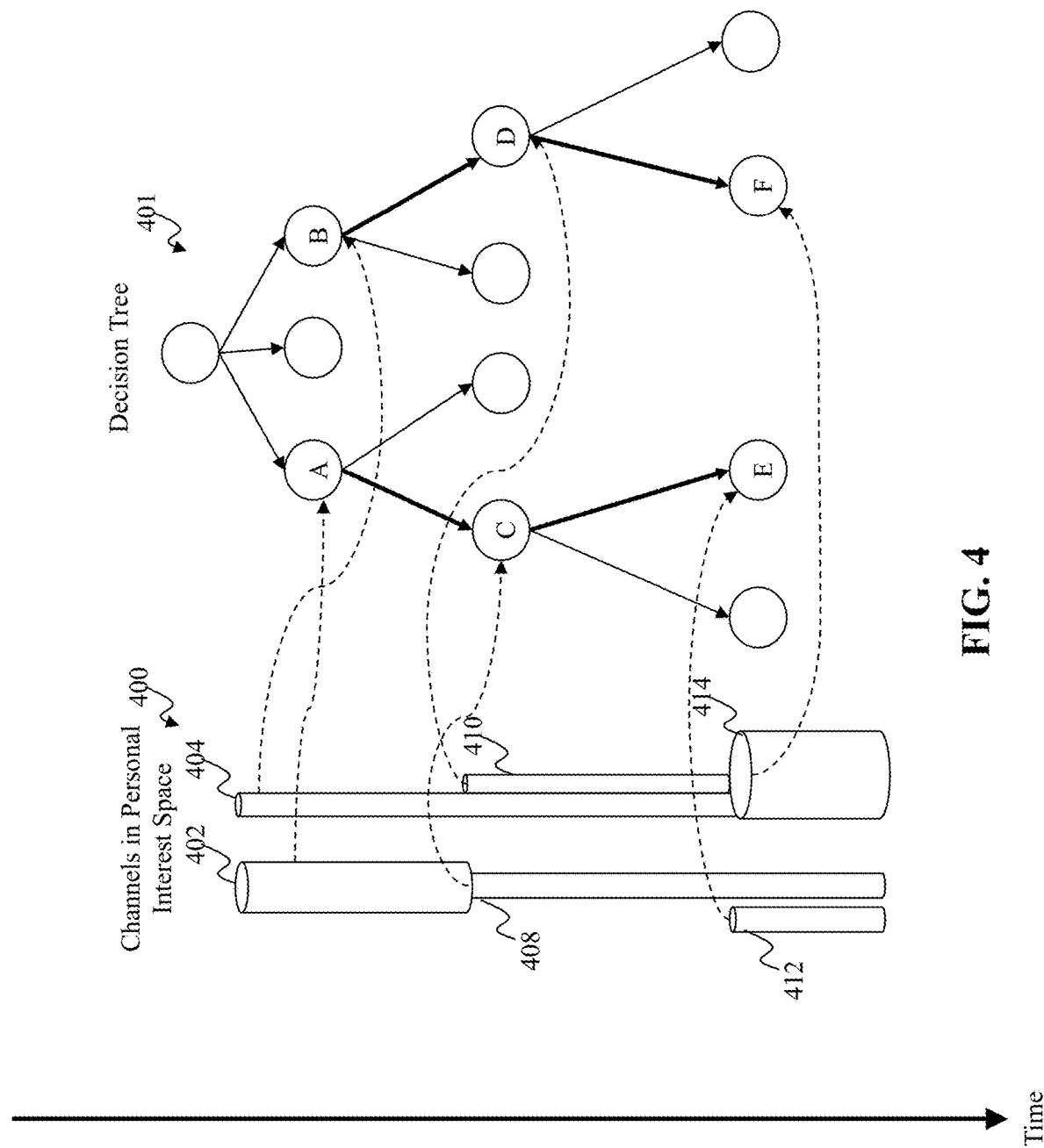
FIGS. 4 and 5 are depictions of an exemplary process of exploring a personal interest space based on a decision tree, according to an embodiment of the present teaching.
Figure 5:
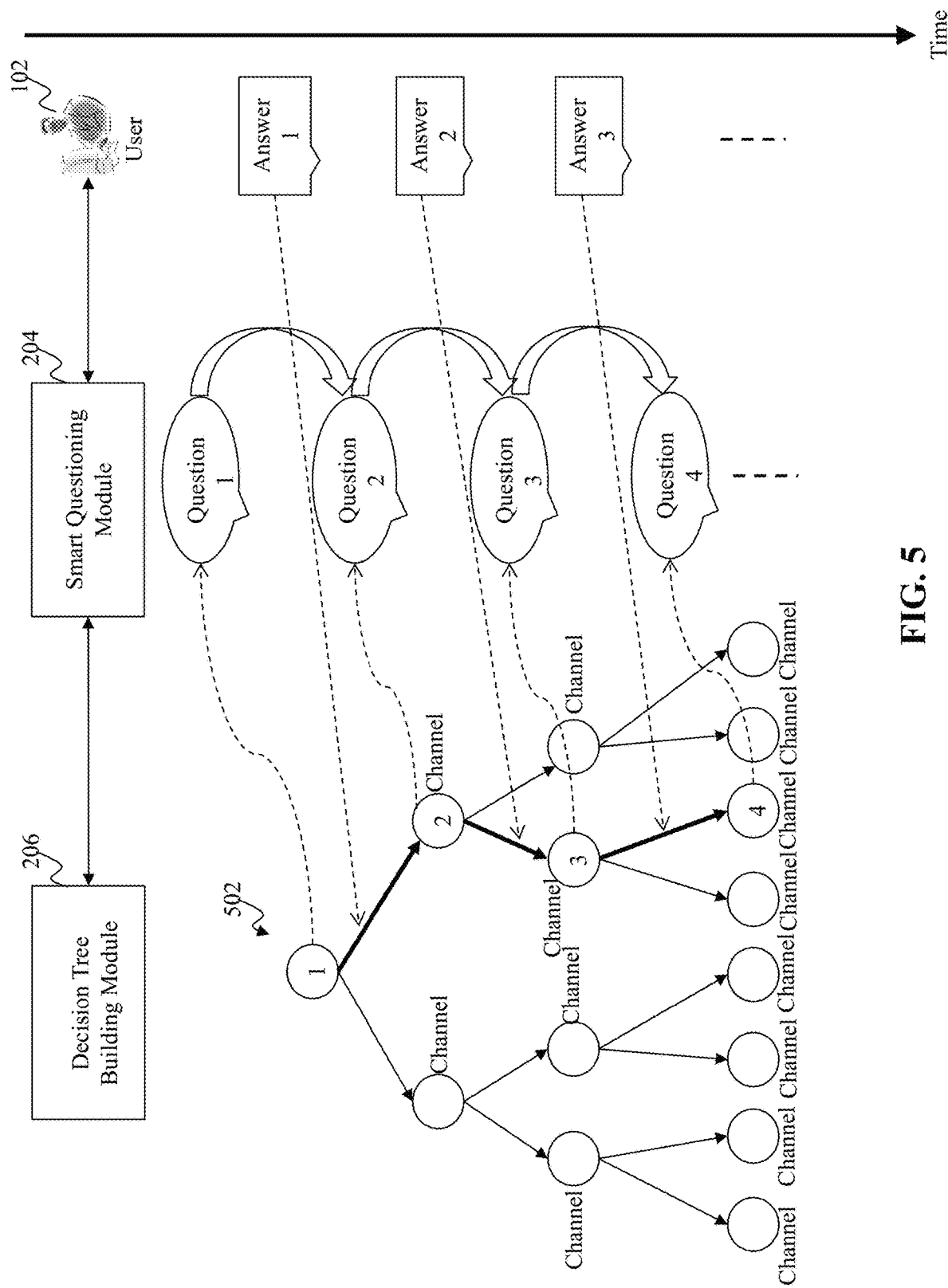

FIGS. 4 and 5 are depictions of an exemplary process of exploring a personal interest space based on a decision tree, according to an embodiment of the present teaching. As shown in FIG. 4, a user's personal interest space 400 is updated according to a decision tree 401 over times. In this example, the personal interest space 400 initially includes two channels, i.e., a sports channel 402 and a pop music channel 404, which correspond to nodes A and B of the decision tree 401, respectively. If it is observed that the exploration of the user's personal interest space 400 has reached a bottle neck (e.g., no change in the personal interest space 400 for a while), questions may be asked based on nodes A and B associated with the channels 402, 404, respectively. In this example, the question related to node A may be used to get a better understanding of the user's specific interests within the sports channel 402. If the answer indicates that the user is only interested in basketball among all sports, then the user's sports channel 402 is refined to become a more specific channel within the sports channel 402—a basketball channel 408, which is associated with node C. Similarly, the question related to node B may be used to find other channels that are related to the pop music channel 404. If the answer indicates that the user is also interested in classical music, then a new classical music channel 410 is added to the user's personal interest space 400, which is associated with node D of the decision tree 401.

Content items are then recommended to the user based on the updated personal interest space 400, which now includes the basketball channel 408, the pop music channel 404, and the classical music channel 410. In this example, the exploration of the user's personal interest space 400 may reach another bottle neck after a while, which invokes the smart questioning process again based on the decision tree 401. Nodes C and D are used to determine the questions to be asked at this time. If the user's answer to the question associated with node C indicates that the user is also interested in fantasy games (node E), then a new fantasy games channel 412 is added. Similarly, the user's answer to the question associated with node D may indicate that the user is in fact interested in music in general. As a result, a music channel 414 (node F) is generated by merging the existing pop music channel 404 and classical music channel 410.

As shown in FIG. 5, a decision tree 502 is created by the decision tree building module 206. Each node of the decision tree 502 is associated with a channel of content. Traversing down the decision tree 502 from the root node 1, each node is connected to two low-level nodes. For each node of the decision tree 502, the smart questioning module 204 may select one question to ask the user 102. For example, question 1 related to the root node 1 is asked for the user 102, and the user 102's answer 1 guides the decision tree 502 to be traversed down to node 2. Subsequently, question 2 related to node 2 is asked for the user 102, and the user 102's answer 2 further guides the path of traversing down the decision tree 502 towards node 3. As the decision tree 502 is traversed down from the root node 1 based on the user 102's answers to each question, a better understanding of the user 102's interests is achieved.

Figure 6:
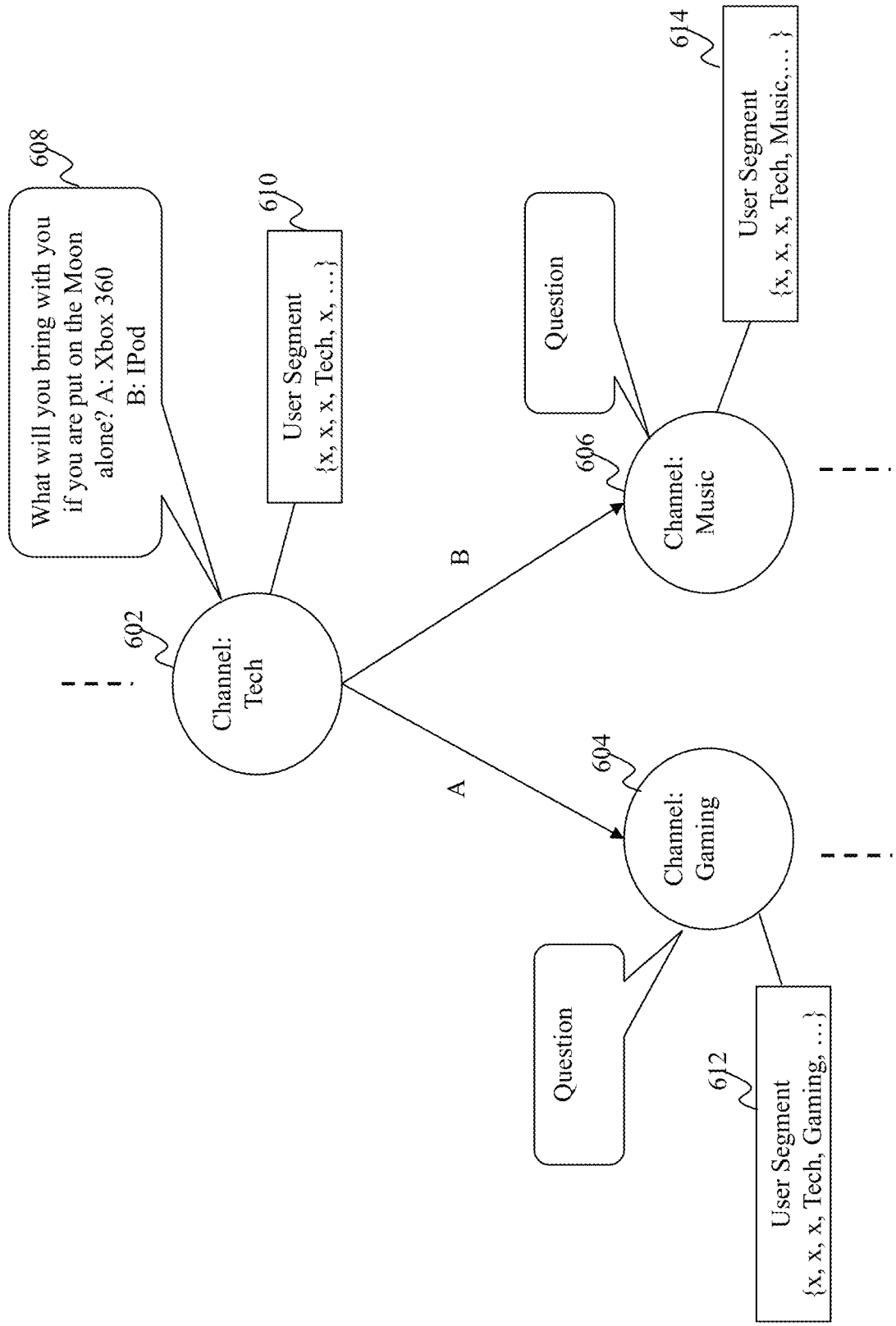
FIG. 6 is a depiction of exemplary nodes of a decision tree, according to an embodiment of the present teaching.

FIG. 6 is a depiction of exemplary nodes of a decision tree, according to an embodiment of the present teaching. Three exemplary nodes 602, 604, 606 are extracted from a decision tree. As the decision tree is created by training a matrix including a plurality of channel vectors for a plurality of users, each node of the decision tree is associated with one of the plurality of channels and a user segment of the plurality of users. For example, node 602 is associated with a technology channel and a user segment 610. The technology channel is one of the features of the training vectors. The user segment 610 includes users who have exhibited a certain level of interest with respect to the technology channel (e.g., subscribed to the technology channel in her/his personal interest space). In this example, the node 602 is associated with a preset question 608. The question 608 may be, "What will you bring with you if you are put on the Moon alone?" with the choices of "A: Xbox 360" and "B: IPod." For better user experience, a question that directly asks for a user's interests may be avoided. Instead, questions that are considered to be interesting and funny may be used. It is also understood that more than two choices may be provided to the user. In other words, each node of a decision tree may be connected to more than two low-level nodes. It is also understood that the user may be allowed to provide more than one answer to a question. That is, more than one node may be identified when traversing down the decision tree based on each of the user's answers.

In this example, answers A and B to the question 608 lead to node 604 and node 606, respectively. Node 604 is associated with a gaming channel, and node 606 is associated with a music channel. Node 604 is associated with a user segment 612, which includes users who have exhibited a certain level of interest with respect to the technology channel and the gaming channel. Similarly, node 606 is associated with a user segment 614, which includes users who have exhibited a certain level of interest with respect to the technology channel and the music channel. As mentioned above, each node 604, 606 may be associated with one or more questions as well so that the decision tree can be further traversed down from the node 604 and/or 606 to the low-level nodes.

Figure 7:
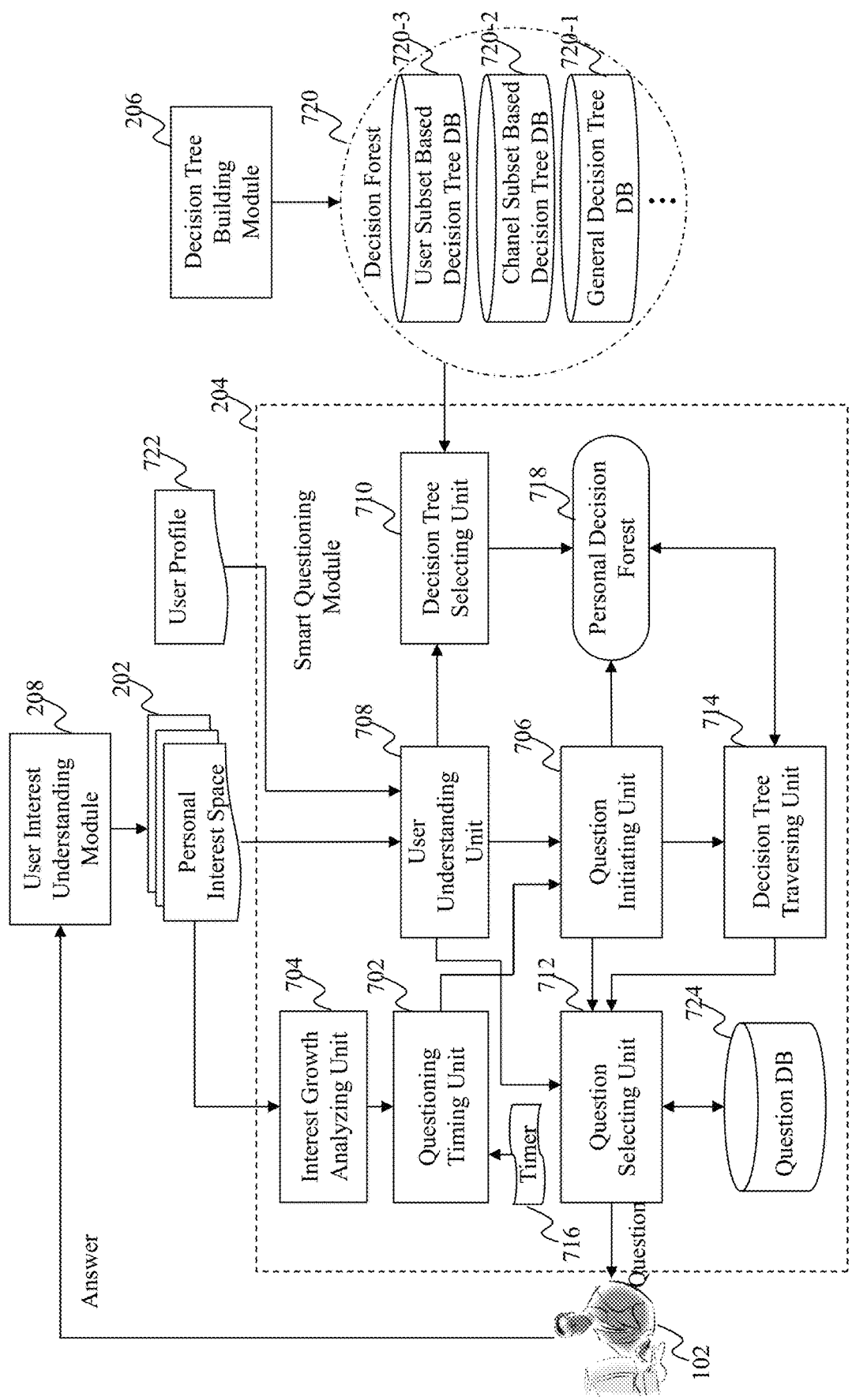
FIG. 7 illustrates an exemplary diagram of a smart questioning module, according to an embodiment of the present teaching.

FIG. 7 illustrates an exemplary diagram of a smart questioning module, according to an embodiment of the present teaching. The smart questioning module 204 in this embodiment works in conjunction with the decision tree building module 206 and the user interest understanding module 208 to ask the user 102 the right questions at the right timings in order to explore the user 102's personal interest space 202. The smart questioning module 204 in this embodiment includes a questioning timing unit 702, an interest growth analyzing unit 704, a question initiating unit 706, a user understanding unit 708, a decision tree selecting unit 710, a question selecting unit 712, and a decision tree traversing unit 714.

The questioning timing unit 702 in this embodiment is configured to determine the timing of asking each question. The timing may be determined based on various factors, for example, the growth of the user 102's personal interest space 202 and the time intervals between questions. The interest growth analyzing unit 704 may be responsible for analyzing the growth of the personal interest space 202 to see if it reaches a plateau/bottle neck. For example, the personal interest space 202 may have not been updated for a while because the user 102 has not interacted with the personal interest space 202 by consuming recommended content or searching and subscribing to any channels. A timer 716 may be used by the questioning timing unit 702 to control the time interval between asking two subsequent questions. A general time interval threshold may be used for all users. In some embodiments, by observing a specific user 102's responses to previous questions, a personalized time interval threshold may be applied for each user. For example, if a user 102 has shown an interest in answering questions asked by the smart questioning module 204 before, then a short time interval threshold may be used for the user 102 in the future as she/he will not likely feel bothered by the questions.

The decision tree selecting unit 710 in this embodiment is configured to select one or more decision trees from the decision forest 720 to create a personal decision forest 718 for the user 102. As mentioned above, the decision forest 720 may include a plurality of decision trees trained by the decision tree building module 206 including, for example, a general decision tree database 720-1, a channel subset based decision tree database 720-2, and a user subset based decision tree database 720-3. The selection made by the decision tree selecting unit 710 may be based on the understanding of the user 102 performed by the user understanding unit 708. The user understanding unit 708 may provide information related to the user 102's subscribed channels in the personal interest space 202 and information related to the user profile 722. In one embodiment, the decision tree selecting unit 710 may select one or more user subset based decision trees based on the user profile 722. For example, if the user 102 is a young, male professional, then the decision tree selecting unit 710 may choose the decision trees that are trained based on training data of existing users who are also young, male professionals. In another embodiment, the decision tree selection unit 710 may select one or more channel subset based decision trees based on the user 102's currently-subscribed channels. For example, if the user 102 has subscribed to a number of channels related to politics, then the decision tree selecting unit 710 may select the decision trees that are trained based on training data with the channel features related to politics as well. In this embodiment, the decision tree selecting unit 710 may select the generic decision tree as well.

The question initiating unit 706 in this embodiment is configured to identify an initiate node on a decision tree in the personal decision forest 718 based on the information related to the user 102 that is provided by the user understanding unit 708. In one embodiment, if the user 102 is a new user, and very limited information related to the user 102 has been provided, then the question initiating unit 706 may set the root node of a decision tree as the starting point. Otherwise, the question initiating unit 706 may identify one or more nodes of a decision tree based on a matching between the user 102's subscribed channels and the channels associated with each node of the decision tree. Moreover, other user information, such as the user profile 722, may be used to help the question initiating unit 706 to identify the suitable initiate node. For example, if there is a large confidence that the user 102 is a male, then any node that is associated with a female-related channel may be ruled out as being an initiate node by the question initiating unit 706.

The question selecting unit 712 in this embodiment is configured to determine a question for the user 102 in connection with the node identified by the question initiating unit 706. As mentioned above, each node of a decision tree is associated with a channel of content. For each channel of content, a plurality of relevant questions may be predetermined and stored in the question database 724. Although multiple questions may be associated with the same node/channel, each of them may be designed to be asked for particular type of users. The question selecting unit 712 may first identify a plurality of questions in connection with a particular node identified by the question initiating unit 706 and then based on the information of the user 102 provided by the user understanding unit 708, further select one of those questions that the user 102 is most likely to answer. In other words, for example, even for the same node, different questions may be asked for a female user and a male user. Additional rules may be applied by the question selecting unit 712 to select the right question for the user 102. For example, a new question cannot contradict with previously asked questions or be duplicated with the previously asked questions.

In this embodiment, on one hand, the answers to the questions are provided by the user 102 to the user interest understanding module 208 in order to update the personal interest space 202. On the other hand, the decision tree traversing unit 714 in this embodiment is configured to identify additional nodes on the decision tree based on the answers to the previous questions provided by the user 102. In one embodiment, the additional nodes are identified by traversing down the decision tree from the initiate node based on the answers to the previous questions. The identified additional nodes and channels associated therewith are provided to the question selecting unit 712 for selecting corresponding questions. Each question is asked at a timing determined by the questioning timing unit 702. It is understood that the granularity of the decision tree becomes finer as the decision tree is traversed down. Thus, in other words, generic questions are asked before the fine and specific questions are asked.

Figure 8:
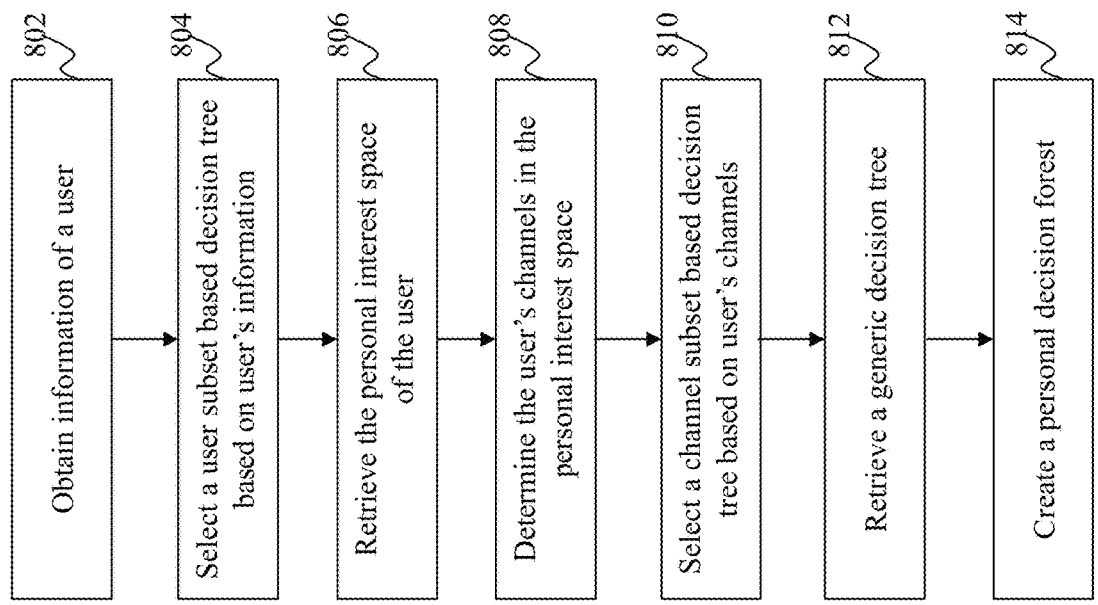
FIG. 8 is a flowchart of an exemplary process of creating a personal decision forest for a user, according to an embodiment of the present teaching.

FIG. 8 is a flowchart of an exemplary process of creating a personal decision forest for a user, according to an embodiment of the present teaching. Starting at 802, information related to a user is obtained. The information may include the user profile. At 804, a user subset based decision tree is selected based on the user's information. At 806, the personal interest space of the user is retrieved. At 808, channels subscribed by the user are determined from the user's personal interest space. At 810, a channel subset based decision tree is selected based on the user's subscribed channels. At 812, a generic decision tree is retrieved. At 814, a personal decision forest including the generic decision tree, the user subset based decision tree, and the channel subset based decision tree is created for the user.

Figure 9:
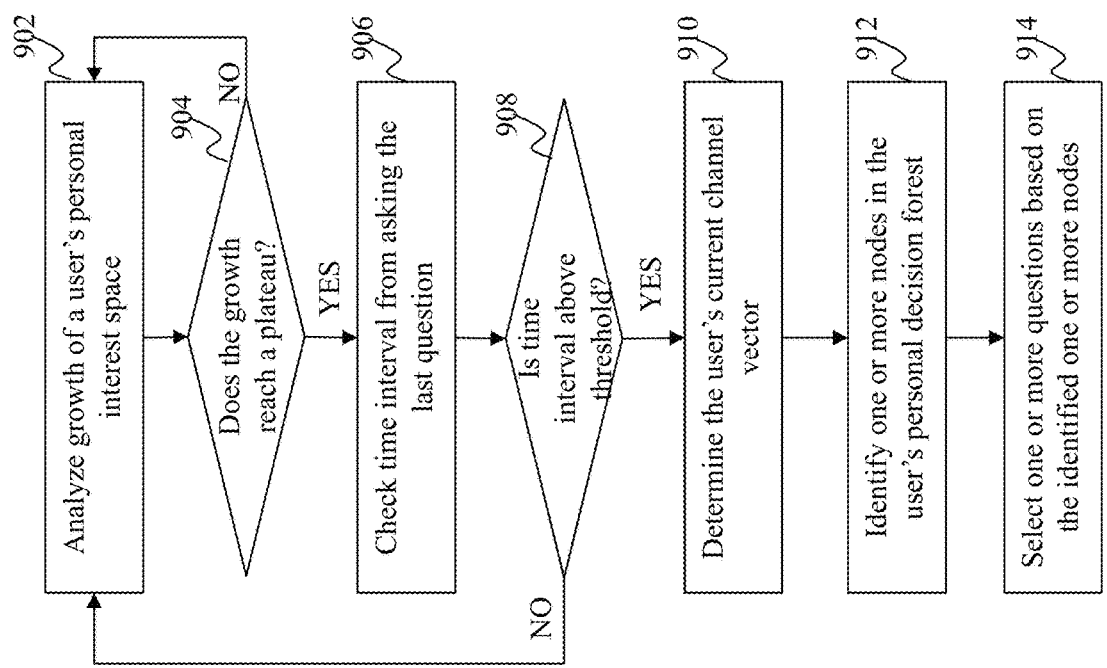
FIG. 9 is a flowchart of an exemplary process of determining timings for asking questions, according to an embodiment of the present teaching.

FIG. 9 is a flowchart of an exemplary process of determining timings for asking questions, according to an embodiment of the present teaching. Starting at 902, the growth of a user's personal interest space is analyzed. At 904, whether the growth of the user's personal interest space has reached a plateau/bottle neck is determined. If the answer is negative, the process returns to 902. Otherwise, at 906, the time interval from asking the last question is checked. At 908, whether the time interval is above the time interval threshold is determined. If the answer is negative, the process returns to 902. Otherwise, at 910, the user's current channel vector is determined based on the user's subscribed channels in the personal interest space. The value of each channel feature is indicative of the level of interest of the user with respect to the corresponding channel. At 912, one or more nodes in the user's personal decision forest are identified based on the user's current channel vector. At 914, one or more questions are selected based on the identified one or more nodes.

Figure 10:
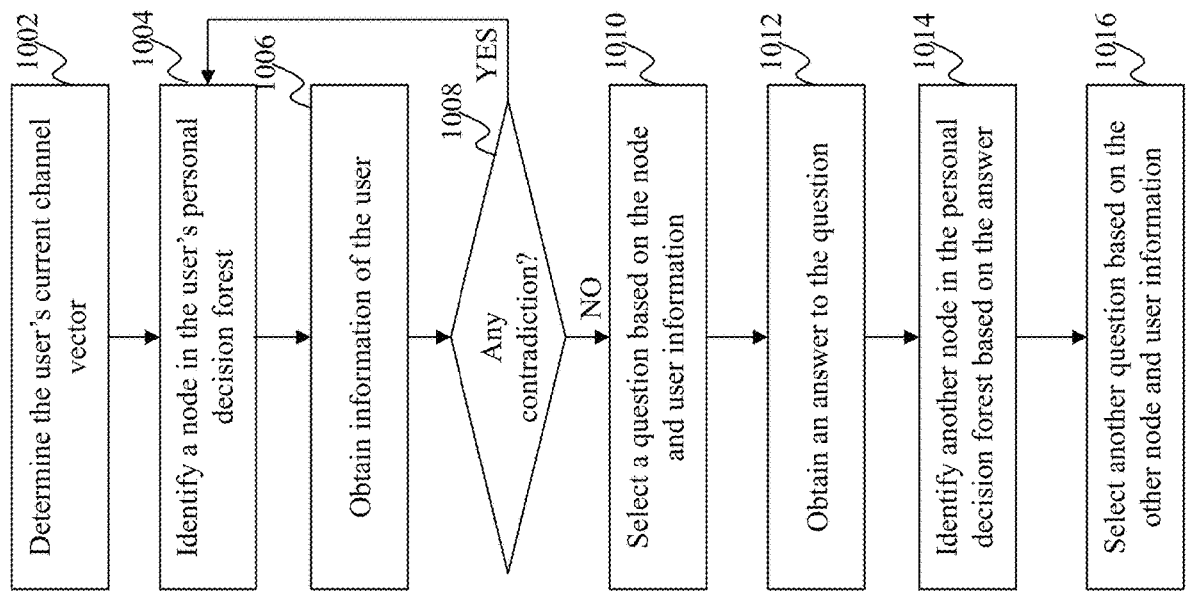
FIG. 10 is a flowchart of an exemplary process of smart questioning based on a personal decision forest, according to an embodiment of the present teaching.

FIG. 10 is a flowchart of an exemplary process of smart questioning based on a personal decision forest, according to an embodiment of the present teaching. Starting at 1002, a user's current channel vector is determined. The channel vector may be determined based on the user's subscribed channels in the personal interest space. The value of each channel feature is indicative of the level of interest of the user with respect to the corresponding channel. At 1004, a node in the user's personal decision forest is identified based on the user's current channel vector. At 1006, information of the user, e.g., the user profile, is obtained. At 1008, whether there is any contradiction between the user's information and the identified node is checked. If the answer is positive, the process returns to 1004 to identify a different node. Otherwise, at 1010, a question is selected based on the node and the information of the user. At 1012, an answer to the question is obtained from the user. At 1014, another node in the personal decision forest is identified based on the answer, for example, by traversing down the decision tree from the previous node. At 1016, another question is selected based on the node identified at 1014 and the information of the user.

Figure 14:
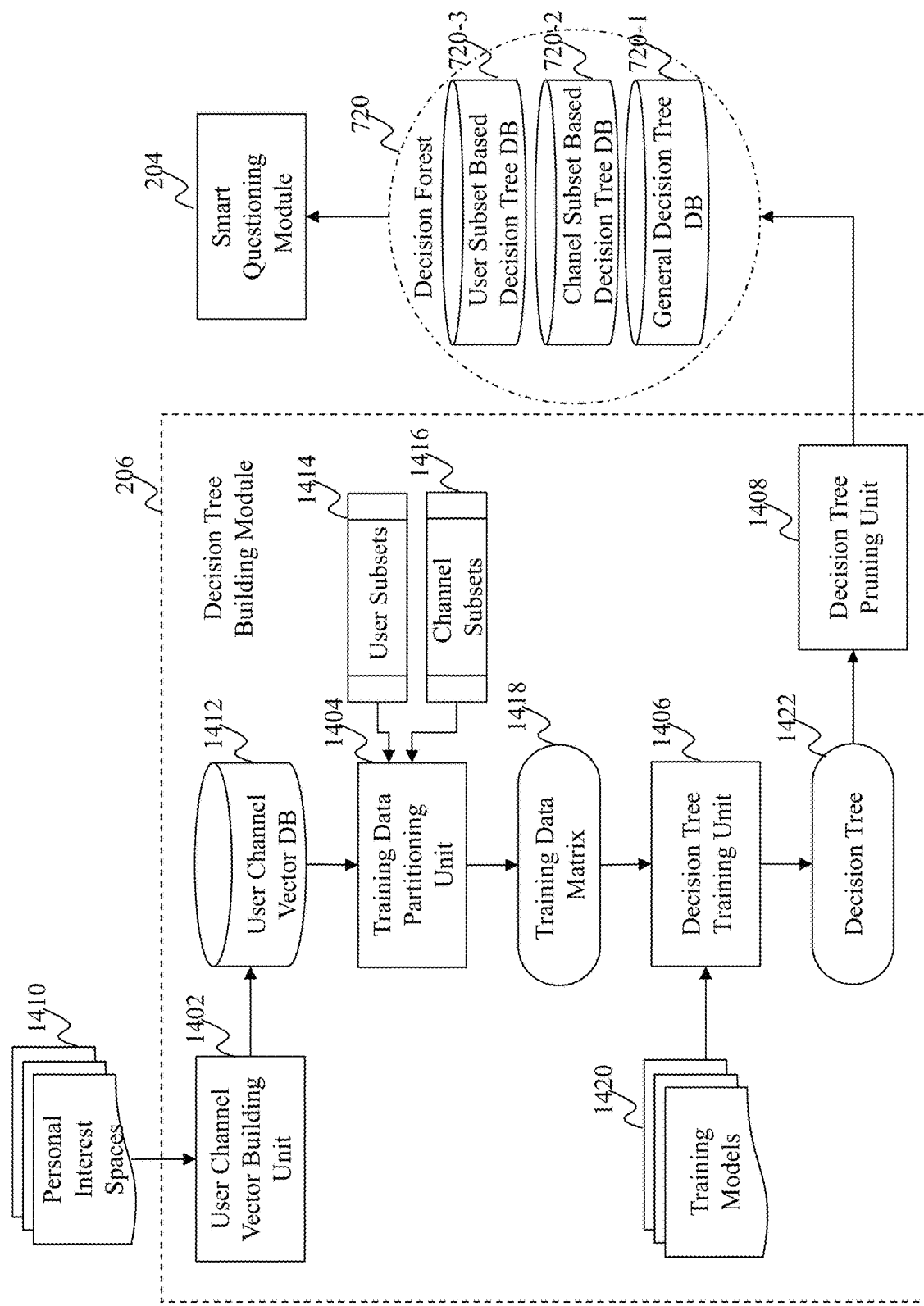
FIG. 14 illustrates an exemplary diagram of a decision tree building module, according to an embodiment of the present teaching.

FIG. 14 illustrates an exemplary diagram of a decision tree building module, according to an embodiment of the present teaching. The decision tree building module 206 in this embodiment includes a user channel vector building unit 1402, a training data partitioning unit 1404, a decision tree training unit 1406, and a decision tree pruning unit 1408. The user channel vector building unit 1402 is configured to retrieve information of existing user's personal interest spaces 1410 and generate channel vectors for each of the existing users based on the levels of interest of the existing user with respect to each of a plurality of channels. As mentioned above in detail, the value of each channel feature in the channel vector may be a numeric value indicative of the level of interest of the existing user with respect to the channel if the existing user has interacted with the channel (e.g., by searching and subscribing to a channel or by declining to subscribe to a recommended channel). If the existing user has not interacted with the channel, i.e., the level of interest with respect to the channel is unknown for the existing use, then an "unassigned" value may be initially assigned in the channel vector. All the existing user's channel vectors are stored in the user channel vector database 1412.

In this embodiment, the training data partitioning unit 1404 may separate the data in the user channel vector database 1412 into various data subsets in the user dimension and/or the channel dimension. For example, predetermined user subsets 1414 (e.g., age groups, genders, occupations, etc.) and channel subsets 1416 (e.g., sports, music, politics, etc.) may be used by the training data partitioning unit 1404 for dividing the training data set. A training data matrix 1418 is generated based on the divided training data set. It is understood that the training data set may not be divided by the training data partitioning unit 1404 in some embodiments so that the training data matrix 1418 represents all existing user's channel vectors with respect to all channels used by the interest engine 201.

The decision tree training unit 1406 in this embodiment is responsible for creating a decision tree 1422 based on the training data matrix 1418 in accordance with a training model 1420. The training model 1420 may be, for example, an EM model. In this example, for all "unassigned" values in the training data matrix 1418, a value of "1" or "0" may be randomly assigned. An EM algorithm may be used to iteratively train a decision tree using the training data matrix 1418 until the termination condition is met (converged). At the end, the decision tree 1422 is obtained, and each channel feature of each user has either an observed or assigned value. In some embodiments, the decision tree 1422 may be a probability based decision tree.

In one embodiment, one EM algorithm includes the following steps:
(1) Randomly assign 1/0 (or simply assign 0) to each <user, channel feature> pair of which the channel feature value is missing.
(2) Build a root-mean-square-error (RMSE) decision tree with the above data set. The RMSE loss function is the weighted combination of (a) true label loss function and (b) assigned label loss function, where (a) should have a higher weight than (b).
(3) For each user, assign values to all her/his missing channel features according to the leaf node predictions (in case of binary representation, the values would be the [(# of node mates with positive value/# of node mates with negative value)/global ratio]>threshold?1:0. The default threshold could be 1, but subject to empirical tuning.
(4) Recalculate the channel feature probability distribution on the entire data set and update the global ratio.
(5) Repeat the above steps 2, 3, and 4 until the termination condition is met.

In another embodiment, another EM algorithm includes the following steps:
(1) According to a predetermined probability, randomly assign 1/0 to each <user, channel feature> pair of which the channel feature value is missing.
(2) Build a RMSE decision tree with the above data set. The RMSE loss function is the weighted combination of (a) true label loss function, (b) assigned positive loss function, and (c) assigned negative loss function, where (a) should have a higher weight than (b) and (c), and (b) and (c) have an equal weight.
(3) For each user, assign values to all her/his missing channel features according to its leaf node predictions (in case of binary representation, the values would be the (# of node mates with positive value># of node mates with negative value?1:0).
(4) Recalculate the channel feature probability distribution on the entire data set, and accordingly maintain the predetermined probability by reassigning weights to assigned labels.
(5) Repeat the above steps 2, 3 and 4 until the termination condition is met.

The decision tree pruning unit 1408 in this embodiment may adjust the trained decision tree 1422. For example, duplicated nodes in the decision tree 1422 may be merged. The adjustment may be performed manually based on human knowledge or automatically or semi-automatically based on preset rules and conditions. The pruned decision tree is stored in the decision forest 720, which is to be used by the smart questioning module 204.

Figure 15:
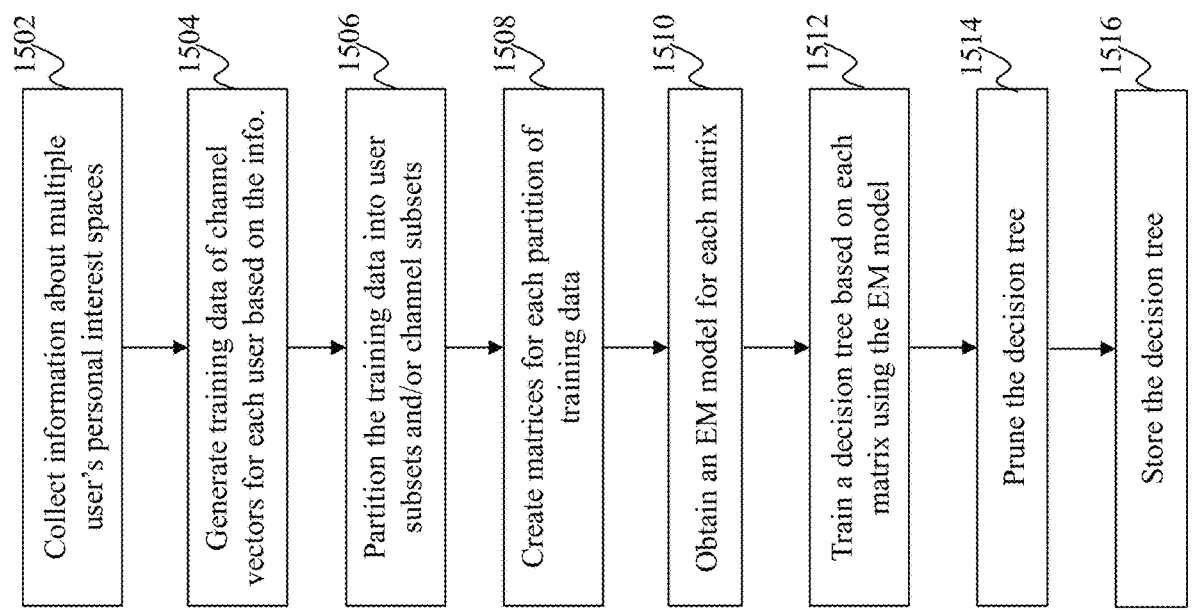
FIG. 15 is a flowchart of an exemplary process of building a decision tree, according to an embodiment of the present teaching.

FIG. 15 is a flowchart of an exemplary process of building a decision tree, according to an embodiment of the present teaching. Starting at 1502, information about multiple existing user's personal interest spaces is collected. At 1504, training data of channel vectors for the existing users is generated based on the collected information. At 1506, the training data is partitioned into user subsets and/or channel subsets. At 1508, matrices are created for each partition of the training data. At 1510, an EM model is obtained for each matrix. At 1512, a decision tree is trained base on each matrix using the obtained EM model. At 1514, the trained decision tree is pruned. At 1516, the decision tree is stored for future use.

Figure 16:
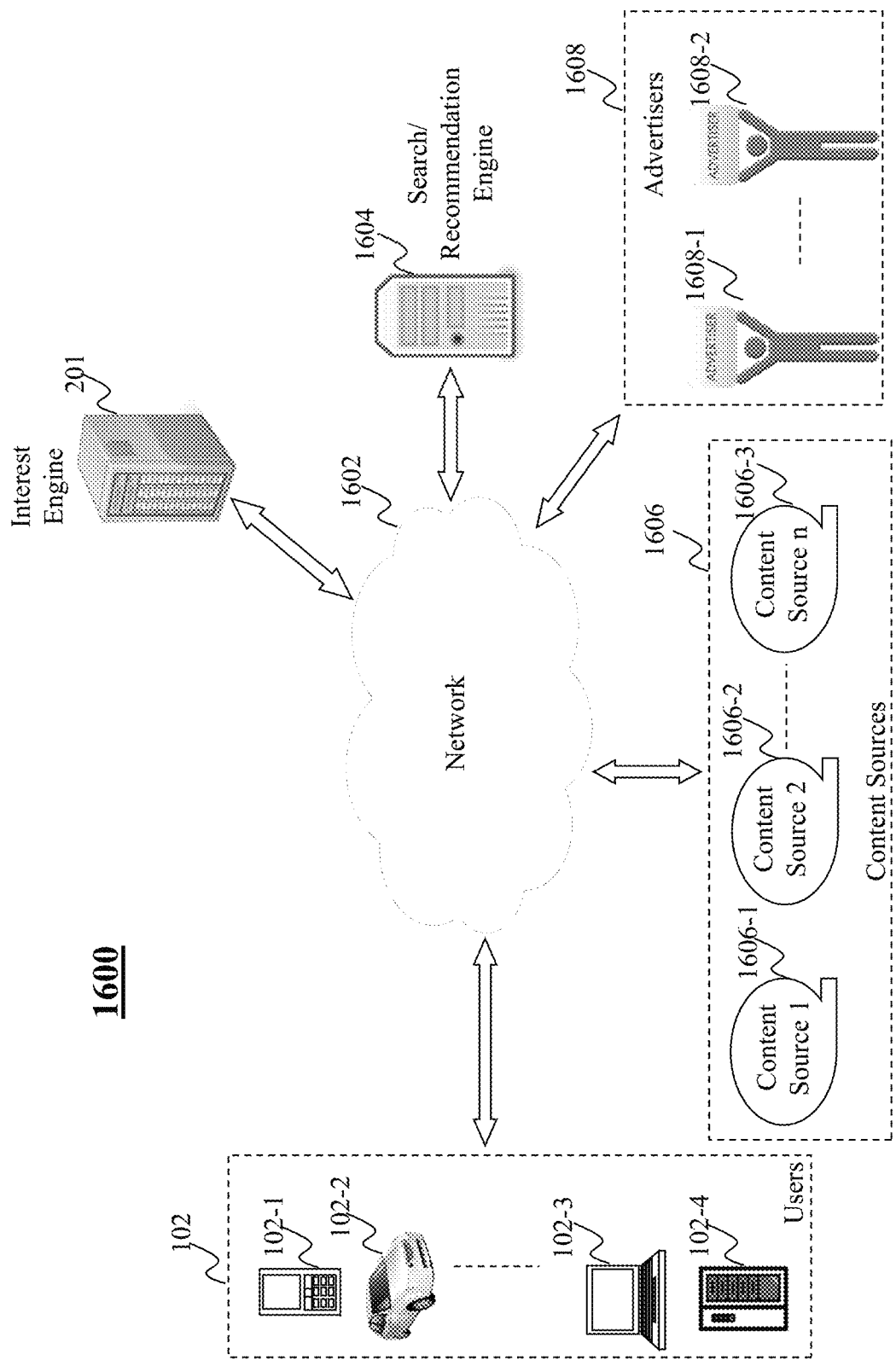
FIG. 16 is a high level depiction of an exemplary networked environment for exploring a personal interest space, according to an embodiment of the present teaching.

FIG. 16 is a high-level depiction of an exemplary networked environment for exploring a personal interest space, according to an embodiment of the present teaching. In FIG. 16, the exemplary networked environment 1600 includes one or more users 102, a network 1602, the interest engine 201, a search/recommendation engine 1604, one or more advertisers 1608, and content sources 1606. The network 1602 may be a single network or a combination of different networks. For example, the network 1602 may be a local area network (LAN), a wide area network (WAN), a public network, a private network, a proprietary network, a Public Telephone Switched Network (PSTN), the Internet, a wireless network, a virtual network, or any combination thereof.

Users 102 may be of different types such as users connected to the network 1602 via desktop computers 102-4, laptop computers 102-3, a built-in device in a motor vehicle 102-2, or a mobile device 102-1. In one embodiment, users 102 may be connected to the network 1602 and able to access and interact with online content provided by the interest engine 201 through wired or wireless technologies and related operating systems implemented within user-wearable devices (e.g., glasses, wrist watch, etc.). A user 102 may send a request for online content to the interest engine 201 and receive content organized in channels through the network 1602. The user 102 may also receive a question from the interest engine 201 and send the answer to the interest engine 201 via the network 1602.

The interest engine 201 in this embodiment may serve as a backend for an interest portal associated with an entity, which may be an individual, a firm, or an organization, such as a television station, a newspaper issuer, a web page host, an online service provider, an app manager, or a game server. For example, the interest engine 201 can be provided by an organization such as USPTO.gov, a content provider such as CNN.com and google.com, or a content-feed source such as tweeter or blogs. In one embodiment, the interest engine 201 may be provided by entities that develop, support and/or provide online content via mobile applications (e.g., installed on smartphones, tablet devices, etc.). Content provided by the interest engine 201 may include, for example, graphics, data, news, articles, software-based products, and so forth. The interest engine 201 may provide software or app used to access the content.

Referring to the above example, the content sent to user 102 may be generated by the interest engine 201 based on the content sources 1606. A content source 1606 may correspond to an entity where the content was originally generated and/or stored. For example, a novel may be originally printed in a magazine, but then posted online at a web site controlled by a content provider managing the interest engine 201. The content sources 1606 in the exemplary networked environment 1600 include multiple content sources 1606-1, 1606-2 . . . 1606-3.

A user 102 may also submit a search query to the interest engine 201 via an interest portal. The interest engine 201 may forward the query to the search/recommendation engine 1604 for performing a search based on the query. In one embodiment, the query may be used to search for a channel provided by the interest engine 201. When there is no channel matching the query, the interest engine 201 may provide an option for the user 102 to create a new channel based on the query and subscribe to the new channel. When the user 102 is entering the query via the interest portal, the interest engine 201 may provide query suggestions each of which is a name of a channel stored at the interest engine 201. In another embodiment, the query may be used to search for content items within one or more channels provided by the interest engine 201. The interest engine 201 may also cooperate with the search/recommendation engine 1604 to recommend a channel or a content item within a channel to a user 102. The recommendation may be based on the user 102's assigned channels, the user 102's activities, or other information related to the user 102. It is understood that the search/recommendation engine 1604 may also perform regular search and recommendation operations based on unorganized content online. It can also be understood that in some embodiments, the search engine and the recommendation engine are separate from each other.

When content is sent to the user 102, one or more advertising opportunities may be available for one or more advertisements to be presented with the content to the user 102, through a same channel, on a same web page, via a same application, or in a same user session. For an available advertising opportunity, the interest engine 201 may send a request to advertisers 1608 to ask for advertisements. In one embodiment, the request may include a bid request, such that the interest engine 201 can sell the advertising opportunity by soliciting bids from the advertisers 1608. An advertiser 1608 may correspond to an entity, whether an individual, a firm, or an organization, doing or planning to do (or otherwise involved in) advertising business. As such, an advertiser 1608 may be an entity that provides product(s) and/or service(s), and itself handles the advertising process for its own product(s) and/or service(s) at a platform (e.g., websites, mobile applications, etc.). For example, advertisers 1608-1 . . . 1608-2 may include companies like General Motors, BestBuy, or Disney. In some other cases, however, an advertiser 1608 may be an entity that only handles the advertising process for product(s) and/or service(s) provided by another entity. In one embodiment, the advertisers 1608 have stored their advertisements at an advertisement database connected to the interest engine 201.

Figure 17:
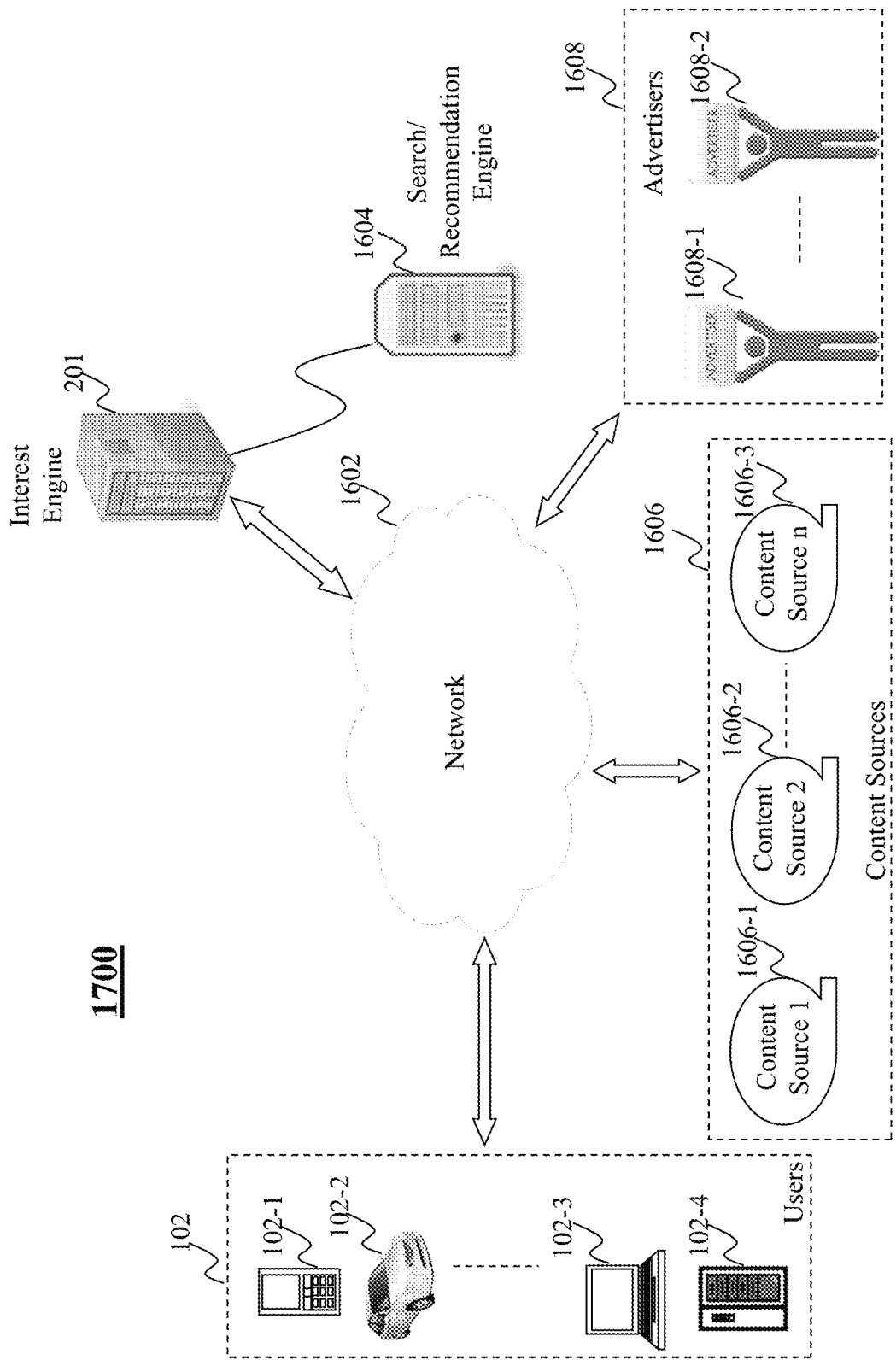
FIG. 17 is a high level depiction of another exemplary networked environment for exploring a personal interest space, according to an embodiment of the present teaching.

FIG. 17 is a high-level depiction of another exemplary networked environment for exploring a personal interest space, according to an embodiment of the present teaching. The exemplary networked environment 1700 in this embodiment is similar to the exemplary networked environment 1600 in FIG. 16, except that the search/recommendation engine 1604 serves as a backend system for the interest engine 201.

Figure 18:
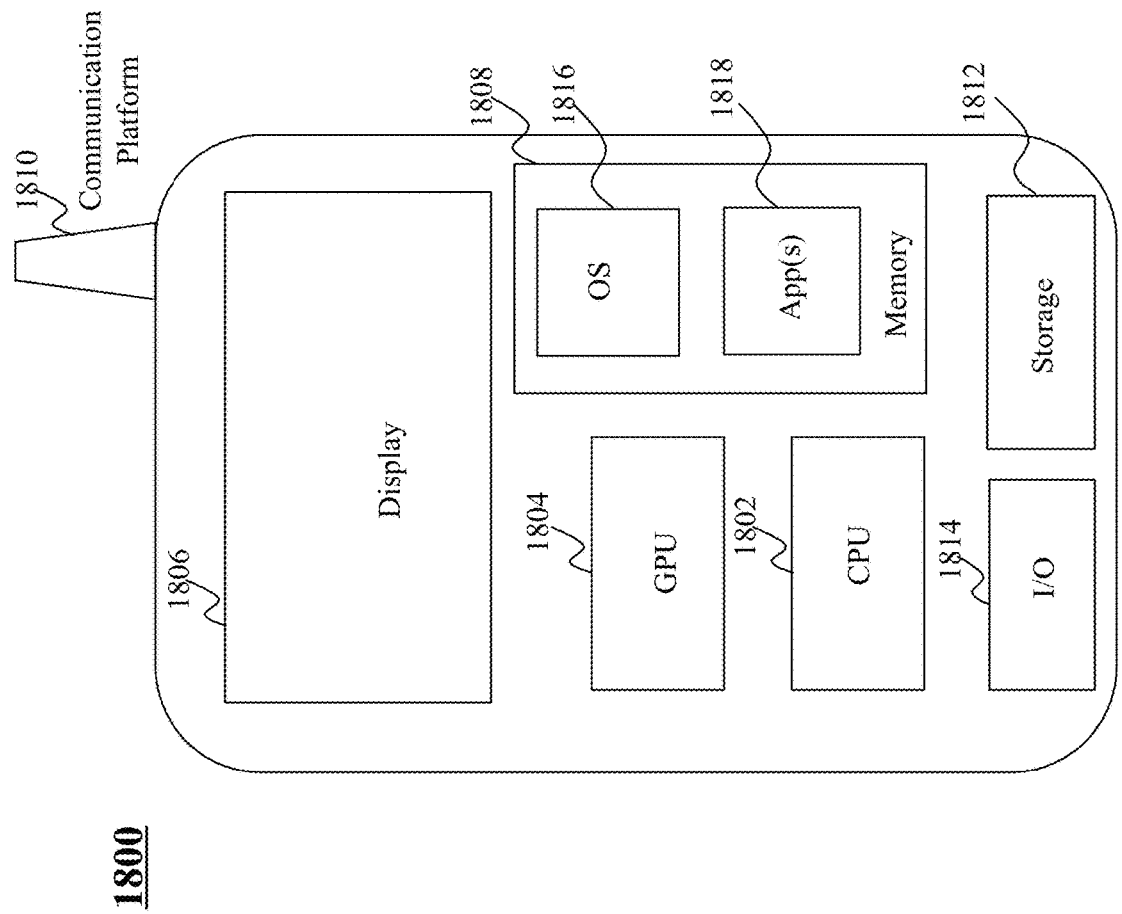
FIG. 18 depicts the architecture of a mobile device which can be used to implement a specialized system incorporating the present teaching.

FIG. 18 depicts the architecture of a mobile device which can be used to realize a specialized system implementing the present teaching. In this example, a device of the user 102 used for interacting with the interest engine 201 may be a mobile device 1800, including, but is not limited to, a smart phone, a tablet, a music player, a handheld gaming console, a global positioning system (GPS) receiver, and a wearable computing device (e.g., eyeglasses, wrist watch, etc.), or in any other form. The mobile device 1800 in this example includes one or more central processing units (CPUs) 1802, one or more graphic processing units (GPUs) 1804, a display 1806, a memory 1808, a communication platform 1810, such as a wireless communication module, storage 1812, and one or more input/output (I/O) devices 1814. Any other suitable component, such as but not limited to a system bus or a controller (not shown), may also be included in the mobile device 1800. As shown in FIG. 18, a mobile operating system 1816, e.g., iOS, Android, Windows Phone, etc., and one or more applications 1818 may be loaded into the memory 1808 from the storage 1812 in order to be executed by the CPU 1802. The applications 1818 may include a web browser or any other suitable mobile apps used for interacting with the interest engine 201. Execution of the applications 1818 may cause the mobile device 1800 to perform some processing as described in the present teaching. For example, user inputs may be received via the I/O devices 1814 and sent to the interest engine 201 via the communication platform 1810. Presentation of the recommended content to the user 102 may be made by the GPU 1804 in conjunction with the display 1806.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 19:
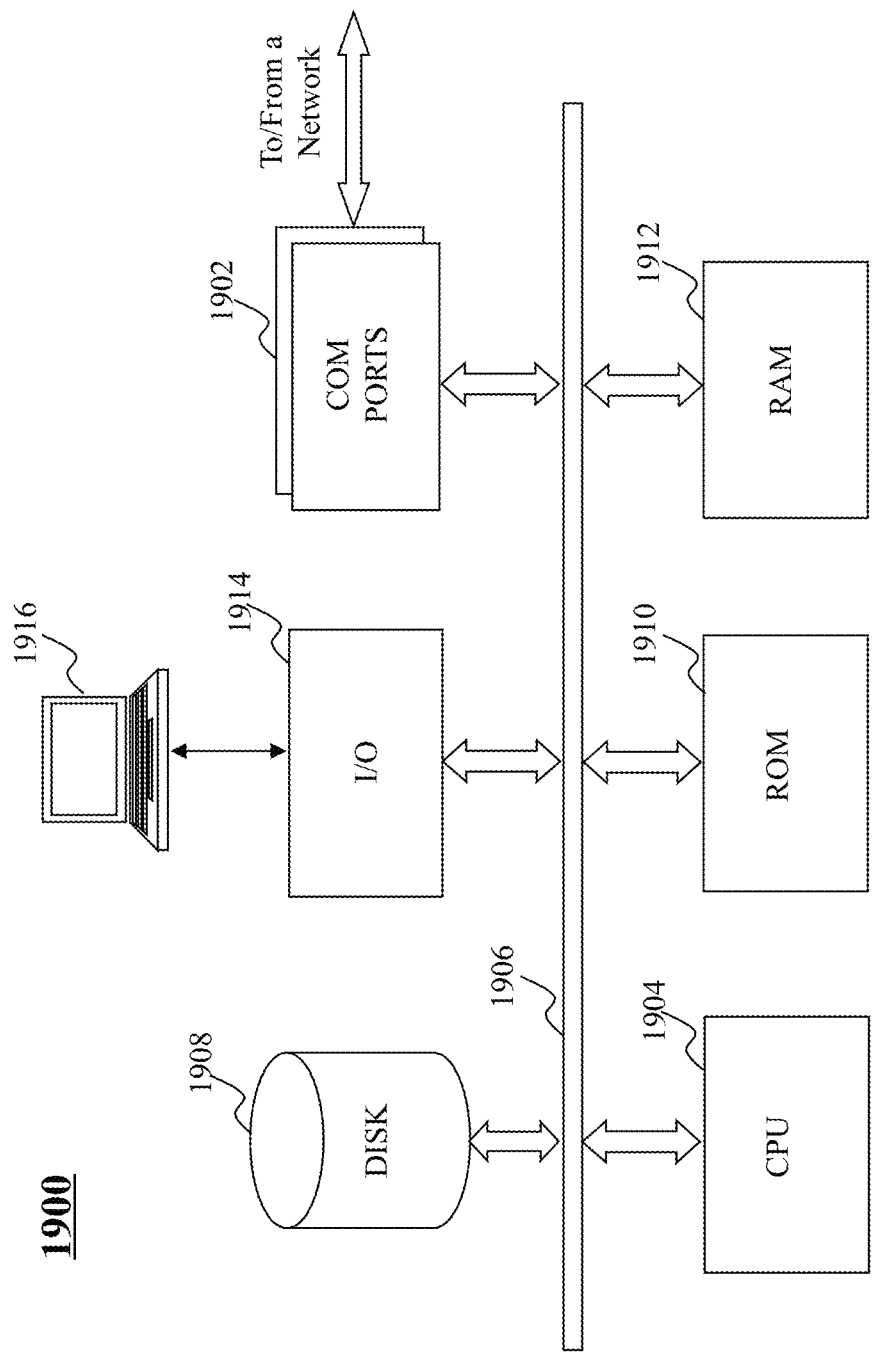
FIG. 19 depicts the architecture of a computer which can be used to implement a specialized system incorporating the present teaching.

FIG. 19 depicts the architecture of a computing device which can be used to realize a specialized system implementing the present teaching. The computer may be a general-purpose computer or a special purpose computer. This computer 1900 can be used to implement any components of the personal interest space exploration architecture as described herein. Different components of the system, e.g., as depicted in FIG. 2, can all be implemented on one or more computers such as computer 1900, via its hardware, software program, firmware, or a combination thereof. Although only one such computer is shown, for convenience, the computer functions relating to medical record completion may be implemented in a distributed fashion on a number of similar platforms, to distribute the processing load.

The computer 1900, for example, includes COM ports 1902 connected to and from a network connected thereto to facilitate data communications. The computer 1900 also includes a CPU 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU 1904. The computer 1900 also includes an I/O component 1914, supporting input/output flows between the computer and other components therein such as user interface elements 1916. The computer 1900 may also receive programming and data via network communications.

Hence, aspects of the method of personal interest space exploration, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the personal interest space exploration system and its components as disclosed herein can be implemented as a firmware, firmware/software combination, firmware/hardware combination, or a hardware/firmware/software combination.

While the foregoing has described what are considered to constitute the present teachings and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on a machine having at least one processor, storage, and a communication platform connected to a network for exploring a personal interest space, the method comprising:

obtaining information related to a personal interest space associated with a user, wherein the personal interest space comprises at least one channel of content that the user is interested in and is used to automatically recommend content to the user;

constructing a decision tree having multiple nodes, each of which is associated with at least some of a plurality of channels of content, one or more of a plurality of users interested in the at least some channel, and at least one question, wherein the one or more users associated with each of the multiple nodes are learned, via machine learning based on training data recording online activities of the plurality of users, the decision tree includes a sub-tree for the user with at least one node having the user associated therewith and corresponding to the at least one channel of content included in the personal interest space of the user;

determining a time to explore further interest of the user based on a criterion related to growth of the personal interest space of the user;

exploring, at the time, the further interest of the user by:
identifying a first node of the decision tree associated with a first channel of content included in the personal interest space associated with the user,
determining a question for the user attached to the first node in connection with the first channel of content and directed to a second channel of content that is currently not included in the personal interest space,
obtaining an answer to the question from the user, identifying, based on the answer, a second node in the decision tree associated with the second channel of content, and
updating the personal interest space associated with the user based on the second channel of content associated with the second node of the decision tree; and
automatically recommending, to the user, content related to channels of content in the updated personal interest space.

2. The method of claim 1, further comprising:
asking the user the question at the determined timing.

3. The method of claim 1, wherein the question for the user is selected from a plurality of questions in connection with the first node based on the information related to the personal interest space and/or a profile of the user.

4. The method of claim 1, wherein the second node is identified by traversing down the decision tree from the first node based on the answer to the question.

5. The method of claim 1, wherein the training data related to the plurality of users with respect to the plurality of channels of content comprises a plurality of vectors, each of which is indicative of a level at which a respective one of the plurality of users is interested in each of the plurality of channels.

6. The method of claim 5, wherein the decision tree is created by a training model based on the plurality of vectors.

7. The method of claim 1, wherein the sub-tree for the user is created based on the information related to the personal interest space and/or a profile of the user.

8. A system for exploring a personal interest space, comprising:
a hardware processor;
a user understanding unit implemented on the processor and configured for obtaining information related to a personal interest space associated with a user, wherein the personal interest space comprises at least one channel of content that the user is interested in and is used to automatically recommend content to the user;
a decision tree selecting unit implemented on the processor and configured for constructing a decision tree having multiple nodes, each of which is associated with at least some of a plurality of channels of content, one or more of a plurality of users interested in the at least some channel, and at least one question, wherein the one or more users associated with each of the multiple nodes are learned, via machine learning based on training data recording online activities of the plurality of users, the decision tree includes a sub-tree for the user with at least one node having the user associated therewith and corresponding to the at least one channel of content included in the personal interest space of the user;
a question initiating unit implemented on the processor and configured for identifying a first node of the decision tree associated with a first channel of content included in the personal interest space associated with the user;
a questioning timing unit implemented on the processor and configured for determining a time to explore further interest of the user based on a criterion related to growth of the personal interest space of the user;
a question selecting unit implemented on the processor and configured for exploring, at the determined time, the further interest of the user by
identifying a first node of the decision tree associated with a first channel of content included in the personal interest space associated with the user,
determining a question for the user attached to the first node in connection with the first channel of content and directed to a second channel of content that is currently not included in the personal interest space, obtaining an answer to the question from the user, and
identifying, based on the answer, a second node in the decision tree associated with the second channel of content; and
a user interest updating module implemented on the processor and configured for updating the personal interest space associated with the user based on the at least a second channel of content associated with the second node of the decision tree, where the updated personal interest space is used to recommend, to the user, content related to the channels of content in the updated personal interest space.

9. The system of claim 8, wherein the question for the user is selected from a plurality of questions in connection with the first node based on the information related to the personal interest space and/or a profile of the user.

10. The system of claim 8, wherein the second node is identified by traversing down the decision tree from the first node based on the answer to the question.

11. The system of claim 8, wherein the training data related to the plurality of users with respect to the plurality of channels of content comprises a plurality of vectors, each of which is indicative of a level at which a respective one of the plurality of users is interested in each of the plurality of channels.

12. The system of claim 11, wherein the decision tree is created by a training model based on the plurality of vectors.

13. The system of claim 8, wherein the sub-tree for the user is created based on the information related to the personal interest space and/or a profile of the user.

14. A non-transitory, machine-readable medium having information recorded thereon for exploring a personal interest space, wherein the information, when read by a machine, causes the machine to perform the steps of:
obtaining information related to a personal interest space associated with a user, wherein the personal interest space comprises at least one channel of content that the user is interested in and is used to automatically recommend content to the user;
constructing a decision tree having multiple nodes, each of which is associated with at least some of a plurality of channels of content, one or more of a plurality of users interested in the at least some channel, and at least one question, wherein the one or more users associated with each of the multiple nodes are learned, via machine learning based on training data recording online activities of the plurality of users, the decision tree includes a sub-tree for the user with at least one node having the user associated therewith and corresponding to the at least one channel of content included in the personal interest space of the user;
determining a time to explore further interest of the user based on a criterion related to growth of the personal interest space of the user;
exploring, at the time, the further interest of the user by:
identifying a first node of the decision tree associated with first channel of content included in the personal interest space associated with the user,
determining a question for the user attached to the first node in connection with the first channel of content and directed to a second channel of content that is currently not included in the personal interest space,
obtaining an answer to the question from the user, identifying, based on the answer, a second node in the decision tree associated with the second channel of content, and updating the personal interest space associated with the user based on the second channel of content associated with the second node of the decision tree; and automatically recommending, to the user, content related to channels of content in the updated personal interest space.

15. The medium of claim 14, wherein the information, when read by the machine, further causes the machine to:
asking the user the question at the determined timing.

16. The medium of claim 14, wherein the question for the user is selected from a plurality of questions in connection with the first node based on the information related to the personal interest space and/or a profile of the user.

17. The medium of claim 14, wherein the second node is identified by traversing down the decision tree from the first node based on the answer to the question.

18. The medium of claim 14, wherein the training data related to the plurality of users with respect to the plurality of channels of content comprises a plurality of vectors, each of which is indicative of a level at which a respective one of the plurality of users is interested in each of the plurality of channels.

19. The medium of claim 18, wherein the decision tree is created by a training model based on the plurality of vectors.

20. The medium of claim 14, wherein the sub-tree for the user is created based on the information related to the personal interest space and/or a profile of the user.

* * * * *